US012770562B2

(12) United States Patent
Jeong et al.

(10) Patent No.: US 12,770,562 B2
(45) Date of Patent: Oct. 20, 2026

(54) PIXEL AND DISPLAY DEVICE INCLUDING THE SAME

(71) Applicant: Samsung Display Co., LTD., Yongin-si (KR)

(72) Inventors: Wee Joon Jeong, Yongin-si (KR); Wan Sang Kim, Yongin-si (KR); Byoung Kyoo Park, Yongin-si (KR); Jang Un Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 14 days.

(21) Appl. No.: 18/967,012

(22) Filed: Dec. 3, 2024

(65) Prior Publication Data

US 2025/0356804 A1 Nov. 20, 2025

(30) Foreign Application Priority Data

May 16, 2024 (KR) ........................ 10-2024-0063925

(51) Int. Cl.
*G09G 3/3233* (2016.01)

(52) U.S. Cl.
CPC ... *G09G 3/3233* (2013.01); *G09G 2300/0452* (2013.01); *G09G 2300/0809* (2013.01); *G09G 2320/045* (2013.01); *G09G 2320/048* (2013.01)

(58) Field of Classification Search
CPC ......... G09G 3/3233; G09G 2300/0452; G09G 2300/0809; G09G 2320/045; G09G 2320/048
See application file for complete search history.

(56) References Cited

U.S. PATENT DOCUMENTS

| | | | | |
|---|---|---|---|---|
| 10,997,898 | B2 * | 5/2021 | Wang | G09G 3/3291 |
| 12,426,445 | B1 * | 9/2025 | Cui | H10K 59/1213 |
| 2015/0379916 | A1 | 12/2015 | Guo et al. | |
| 2018/0018916 | A1 * | 1/2018 | Chung | G09G 3/3225 |
| 2019/0140030 | A1 * | 5/2019 | Huangfu | G09G 3/3233 |
| 2020/0075691 | A1 * | 3/2020 | Zhou | H10K 59/35 |
| 2020/0251038 | A1 * | 8/2020 | Chien | G09G 5/395 |
| 2020/0273394 | A1 * | 8/2020 | Chen | G09G 3/3614 |
| 2022/0076630 | A1 * | 3/2022 | Pyun | G09G 3/3258 |
| 2024/0332463 | A1 * | 10/2024 | Keum | G02B 27/017 |

FOREIGN PATENT DOCUMENTS

CN 103777393 B 3/2016

* cited by examiner

*Primary Examiner* — Stacy Khoo

(74) *Attorney, Agent, or Firm* — Womble Bond Dickinson (US) LLP

(57) ABSTRACT

A pixel includes: first sub-pixels including a (1_1)th sub-pixel and a (1_2)th sub-pixel; second sub-pixels including a (2_1)th sub-pixel and a (2_2)th sub-pixel, and to emit light of a color different from that of the first sub-pixels; and a third sub-pixel to emit light of a color different from that of each of the first sub-pixels and the second sub-pixels. The (1_1)th sub-pixel and the (2_1)th sub-pixel are to be driven during a first period, and not driven during a second period. The (1_2)th sub-pixel and the (2_2)th sub-pixel are to be driven during the second period, and not driven during the first period.

18 Claims, 21 Drawing Sheets

<FIRST PERIOD (P1)>

<SECOND PERIOD (P2)>

PIXEL AND DISPLAY DEVICE INCLUDING THE SAME

CROSS-REFERENCE TO RELATED APPLICATION

The present application claims priority to and the benefit of Korean patent application No. 10-2024-0063925, filed on May 16, 2024, in the Korean Intellectual Property Office, the entire disclosure of which is incorporated by reference herein.

BACKGROUND

1. Field

Aspects of embodiments of the present disclosure relate to a pixel, and a display device including the pixel.

2. Description of the Related Art

Recently, interest in information displays has been increased. Accordingly, research and development of display devices have been continuously conducted. A display device includes a plurality of pixels connected to data lines and scan lines. Each pixel includes a pixel circuit and a light emitting element. The light emitting element emits light having a predetermined luminance corresponding to a driving current supplied from a driving transistor through the pixel circuit.

Each pixel may include at least two sub-pixels for displaying different colors from each other. When a single sub-pixel for expressing one color is disposed in the pixel, the quality of an image displayed by the display device may be deteriorated when the single sub-pixel is expired.

The above information disclosed in this Background section is for enhancement of understanding of the background of the present disclosure, and therefore, it may contain information that does not constitute prior art.

SUMMARY

Embodiments of the present disclosure may be directed to a pixel that may allow a display device to display an image having an improved quality for a relatively longer time, and the display device including the pixel.

According to one or more embodiments of the present disclosure, a pixel includes: first sub-pixels including a (1_1)th sub-pixel and a (1_2)th sub-pixel; second sub-pixels including a (2_1)th sub-pixel and a (2_2)th sub-pixel, and configured to emit light of a color different from that of the first sub-pixels; and a third sub-pixel configured to emit light of a color different from that of each of the first sub-pixels and the second sub-pixels. The (1_1)th sub-pixel and the (2_1)th sub-pixel are configured to be driven during a first period, and not driven during a second period. The (1_2)th sub-pixel and the (2_2)th sub-pixel are configured to be driven during the second period, and not driven during the first period.

In an embodiment, the (1_1)th sub-pixel and the (1_2)th sub-pixel may be configured to emit light having the same luminance as each other, and the (2_1)th sub-pixel and the (2_2)th sub-pixel may be configured to emit light having the same luminance as each other.

In an embodiment, the (1_1)th sub-pixel and the (1_2)th sub-pixel may be configured to be alternately driven, the (2_1)th sub-pixel and the (2_2)th sub-pixel may be configured to be alternately driven, and each of the first period and the second period may correspond to one frame.

In an embodiment, the first period may be the same as a threshold age of each of the (1_1)th sub-pixel and the (2_1)th sub-pixel.

In an embodiment, the first sub-pixels, the second sub-pixels, and the third sub-pixel may be located side by side with one another along a first direction, the (1_2)th sub-pixel may be located between the (1_1)th sub-pixel and the (2_1)th sub-pixel, and the (2_2)th sub-pixel may be located between the (2_1)th sub-pixel and the third sub-pixel.

In an embodiment, the (1_1)th sub-pixel and the (2_1)th sub-pixel may be located adjacent to each other in a first direction. The (1_2)th sub-pixel may be located adjacent to the (2_2)th sub-pixel in the first direction, and may be located adjacent to the (1_1)th sub-pixel and the (2_1)th sub-pixel in a second direction crossing the first direction. The third sub-pixel may have an 'L' shape that may be inverted in the first direction, and may surround around at least a portion of the (2_2)th sub-pixel.

In an embodiment, the (2_1)th sub-pixel and the (2_2)th sub-pixel may be located adjacent to each other in a first direction, the (1_1)th sub-pixel may be located adjacent to the (2_1)th sub-pixel in a second direction crossing the first direction, the (1_2)th sub-pixel may be located adjacent to the (2_2)th sub-pixel in the second direction, and the third sub-pixel may be located between the (1_1)th sub-pixel and the (1_2)th sub-pixel.

In an embodiment, the (1_1)th sub-pixel, the (2_1)th sub-pixel, the (1_2)th sub-pixel, and the (2_2)th sub-pixel may be sequentially located along a first direction. The third sub-pixel may extend in the first direction, and may be located adjacent to the first sub-pixels and the second sub-pixels in a second direction crossing the first direction.

In an embodiment, the (1_1)th sub-pixel and the (2_1)th sub-pixel may be located adjacent to each other in a first direction. The (1_2)th sub-pixel may be located adjacent to the (2_2)th sub-pixel in the first direction, and may be located adjacent to the (1_1)th sub-pixel and the (2_1)th sub-pixel in a second direction crossing the first direction. The third sub-pixel may have an 'L' shape that may be inverted in the second direction, and may surround around at least a portion of the (2_2)th sub-pixel.

According to one or more embodiments of the present disclosure, a pixel includes: first sub-pixels including a (1_1)th sub-pixel and a (1_2)th sub-pixel; second sub-pixels including a (2_1)th sub-pixel and a (2_2)th sub-pixel, and configured to emit light of a color different from that of the first sub-pixels; and third sub-pixels including a (3_1)th sub-pixel and a (3_2)th sub-pixel, and configured to emit light of a color different from that of each of the first sub-pixels and the second sub-pixels. The (1_1)th sub-pixel, the (2_1)th sub-pixel, and the (3_1)th sub-pixel are configured to be driven during a first period, and not driven during a second period. The (1_2)th sub-pixel, the (2_2)th sub-pixel, and the (3_2)th sub-pixel are configured to be driven during the second period, and not driven during the first period.

In an embodiment, the (1_1)th sub-pixel and the (1_2)th sub-pixel may be configured to emit light with the same luminance as each other, the (2_1)th sub-pixel and the (2_2)th sub-pixel may be configured to emit light with the same luminance as each other, and the (3_1)th sub-pixel and the (3_2)th sub-pixel may be configured to emit light with the same luminance as each other.

In an embodiment, the first sub-pixels, the second sub-pixels, and the third sub-pixels may be located side by side with one another in a first direction, the (1_2)th sub-pixel may be located between the (1_1)th sub-pixel and the (2_1)th sub-pixel, and the (2_2)th sub-pixel may be located between (2_1)th sub-pixel and the (3_1)th sub-pixel.

In an embodiment, the (1_1)th sub-pixel and the (2_1)th sub-pixel may be located adjacent to each other in a first direction. The (1_2)th sub-pixel may be located adjacent to the (2_2)th sub-pixel in the first direction, and may be located adjacent to the (2_1)th sub-pixel and the (2_2)th sub-pixel in a second direction crossing the first direction. The (3_1)th sub-pixel may be located adjacent to the (2_1)th sub-pixel in the first direction, and the (3_2)th sub-pixel may be located adjacent to the (2_2)th sub-pixel in the first direction.

In an embodiment, the (1_1)th sub-pixel, the (2_1)th sub-pixel, the (1_2)th sub-pixel, and the (2_2)th sub-pixel may be sequentially located along a first direction, the (3_1)th sub-pixel may be located adjacent to the (1_1)th sub-pixel and the (2_1)th sub-pixel in a second direction crossing the first direction, and the (3_2)th sub-pixel may be located adjacent to the (2_1)th sub-pixel and the (2_2)th sub-pixel in the second direction.

According to one or more embodiments of the present disclosure, a display device includes: a pixel including a plurality of sub-pixels; and a main controller configured to control the sub-pixels based on driving data and aging data of the sub-pixels. The sub-pixels include: a (1_1)th sub-pixel and a (2_1)th sub-pixel configured to be driven during a first period, and not driven during a second period different from the first period; a (1_2)th sub-pixel and a (2_2)th sub-pixel configured to be driven during the second period, and not driven during the first period; and a third sub-pixel configured to be driven during the first period and the second period.

In an embodiment, the main controller may include: memory including a lookup table configured to store the aging data including information on a threshold age of each of the sub-pixels; an aging determiner configured to generate the driving data on a driving time point of each of the sub-pixels; and a signal generator configured to generate an output control signal for individually controlling the sub-pixels based on the aging data and the driving data.

In an embodiment, the signal generator may be configured to determine the first period to correspond to the threshold age of each of the (1_1)th sub-pixel and the (2_1)th sub-pixel.

In an embodiment, the signal generator may be configured to determine each of the first period and the second period as one frame, the (1_1)th sub-pixel and the (1_2)th sub-pixel may be configured to be alternately driven based on the output control signal, and the (2_1)th sub-pixel and the (2_2)th sub-pixel may be configured to be alternately driven based on the output control signal.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
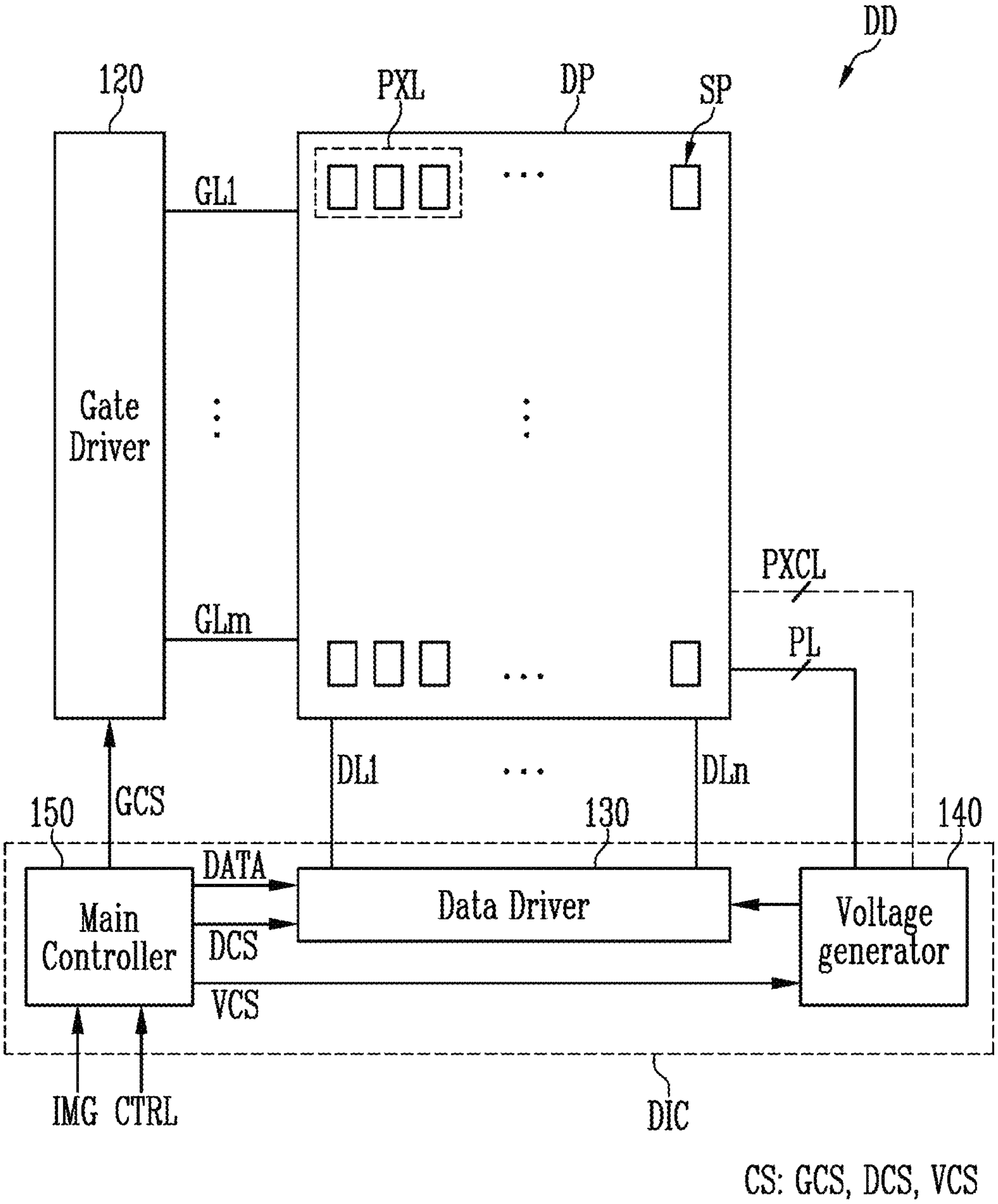
FIG. 1 is a block diagram illustrating a display device, according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In addition, embodiments of the present disclosure may be described with reference to schematic diagrams of idealized embodiments (and an intermediate structure) of the present disclosure, so that changes in a shape as shown due to, for example, manufacturing technology and/or a tolerance may be expected. Therefore, the present disclosure shall not be limited to the specific shapes of a region shown here, but include shape deviations caused by, for example, the manufacturing technology. The regions shown in the drawings are schematic in nature, and the shapes thereof may not represent the actual shapes of the regions of the device.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device, according to an embodiment.

Referring to FIG. 1, the display device DD may include a display panel DP and a display panel driver. The display panel driver may include a gate driver 120, a data driver 130, a voltage generator 140, and a main controller 150.

The display panel DP may include sub-pixels SP. The sub-pixels SP may be connected to the gate driver 120 through first to mth gate lines GL1 to GLm, where m is an integer greater than 1. The sub-pixels SP may be connected to the data driver 130 through first to nth data lines DL1 to DLn, where n is an integer greater than 1.

The sub-pixels SP may generate light of two or more colors. For example, each of the sub-pixels SP may generate light of red, green, blue, cyan, magenta, yellow, white, and/or the like.

Two or more sub-pixels SP from among the sub-pixels SP may constitute a pixel (e.g., one pixel) PXL. For example, the pixel PXL may include three sub-pixels SP as shown in FIG. 1, but the present disclosure is not limited thereto. As such, the pixel PXL may emit light of various suitable colors having various desired luminances according to a combination of the light emitted from the sub-pixels SP included therein.

The gate driver 120 may be connected to the sub-pixels SP arranged in a row direction through the first to mth gate lines GL1 to GLm. The gate driver 120 may output gate signals to the first to mth gate lines GL1 to GLm in response to a gate control signal GCS. In some embodiments, the gate control signal GCS may include a start signal indicating a start of each frame, a horizontal synchronization signal, and the like.

The gate signals may include a first emission signal, a second emission signal, a first compensation signal, a second compensation signal, and an initialization gate signal, which will be described in more detail below.

The gate driver 120 may be disposed at one side of the display panel DP. However, the present disclosure is not limited thereto. For example, the gate driver 120 may be divided into two or more drivers that are physically and/or logically divided from each other, and these drivers may be disposed at one side of the display panel DP and another side (e.g., an opposite side) of the display panel DP, which is opposite to the one side. As such, in some embodiments, the gate driver 120 may be disposed in various suitable forms at the periphery of the display panel DP.

The data driver 130 may be connected to the sub-pixels SP arranged in a column direction through the first to nth data lines DL1 to DLn. The data driver 130 may receive image data DATA and a data control signal DCS from the main controller 150. The data driver 130 may operate in response to the data control signal DCS. In some embodiments, the data control signal DCS may include a source start pulse, a source shift clock, a source output enable signal, and the like.

The data driver 130 may receive voltages from the voltage generator 140. The data driver 130 may apply data signals having grayscale voltages (e.g., grayscale values or levels) corresponding to the image data DATA to the first to nth data lines DL1 to DLn by using the received voltages. When a gate signal is applied to each of the first to mth gate lines GL1 to GLm, data signals corresponding to the image data DATA may be applied to the first to nth data line DL1 to DLm. Accordingly, selected sub-pixels SP may generate light corresponding to the data signals. As such, an image may be displayed on the display panel DP.

In some embodiments, the gate driver 120 and the data driver 130 may include complementary metal-oxide semiconductor (CMOS) circuit elements.

The voltage generator 140 may operate in response to a voltage control signal VCS from the main controller 150. The voltage generator 140 may generate a plurality of voltages, and may provide the generated voltages to the components of the display device DD, such as the gate driver 120, the data driver 130, and the main controller 150. The voltage generator 140 may generate a plurality of voltages by receiving an input voltage from the outside of the display device DD, and regulating the received voltage.

The voltage generator 140 may generate a first power voltage and a second power voltage. The generated first and second power voltages may be provided to the sub-pixels SP through power lines PL. In other embodiments, at least one of the first or second power voltages may be provided from the outside of the display device DD.

As such, the voltage generator 140 may provide various voltages and/or signals. For example, the voltage generator 140 may provide one or more initialization voltages applied to the sub-pixels SP. For example, in a sensing operation for sensing electrical characteristics of transistors and/or light emitting elements of the sub-pixels SP, a reference voltage (e.g., a predetermined reference voltage) may be applied to the first to nth data lines DL1 to DLn. The voltage generator 140 may generate the reference voltage, and may transfer the reference voltage to the data driver 130. For example, in a display operation for displaying an image on the display panel DP, common pixel control signals may be applied to the sub-pixels SP, and the voltage generator 140 may generate the pixel control signals. In some embodiments, the voltage generator 140 may provide the pixel control signals to the sub-pixels SP through pixel control lines PXCL. In FIG. 1, it is illustrated that the pixel control lines PXCL are connected between the voltage generator 140 and the display panel DP. However, the present disclosure is not limited thereto. For example, the pixel control lines PXCL may be connected between the gate driver 120 and the display panel DP. In this case, the pixel control signals may be transferred to the pixel control lines PXCL from the voltage generator 140 through the gate driver 120.

The main controller 150 may control the overall operations of the display device DD. The main controller 150 may receive, from the outside, input image data IMG, and an input control signal CTRL corresponding thereto. The main controller 150 may provide an output control signal CS in response to the input control signal CTRL. For example, the main controller 150 may provide the gate control signal GCS, the data control signal DCS, and the voltage control signal VCS in response to the input control signal CTRL.

The main controller 150 may convert the input image data IMG to be suitable for (e.g., specifications of) the display device DD or the display panel DP, thereby outputting the image data DATA. In some embodiments, the main controller 150 may align the input image data IMG to be suitable for the sub-pixels SP in units of rows, thereby outputting the image data DATA.

Two or more components from among the data driver 130, the voltage generator 140, and/or the main controller 150 may be mounted on one integrated circuit (IC). As shown in FIG. 1, the data driver 130, the voltage generator 140, and the main controller 150 may be included in a driver integrated circuit DIC. The data driver 130, the voltage generator 140, and the main controller 150 may be components that are functionally divided from each other in one driver integrated circuit DIC. In other embodiments, at least one of the data driver 130, the voltage generator 140, or the main controller 150 may be provided as a component (e.g., such as circuit elements or an IC) distinguished (e.g., separate) from the driver integrated circuit DIC.

Figure 2:
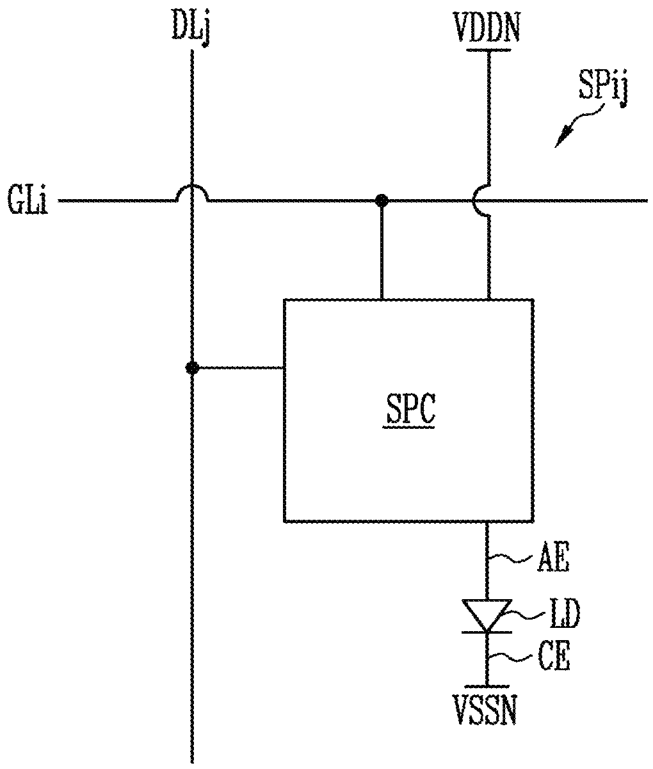
FIG. 2 is a block diagram illustrating any one sub-pixel of FIG. 1, according to an embodiment.

FIG. 2 is a block diagram illustrating any one sub-pixel of FIG. 1, according to an embodiment. In FIG. 2, an ij-th sub-pixel SPij arranged on an ith row (where i is an integer greater than or equal to 1 and less than or equal to m) and a jth column (where j is an integer greater than or equal to 1 and less than or equal to n) from among the sub-pixels SP described above with reference to FIG. 1 is illustrated as a representative example.

Referring to FIG. 2, the sub-pixel SPij may include a sub-pixel circuit SPC and a light emitting element LD.

The light emitting element LD may be connected between a first power voltage node VDDN and a second power voltage node VSSN. The first power voltage node VDDN is connected to one of the power lines PL described above with reference to FIG. 1 to receive a first power voltage. The second power voltage node VSSN is connected to another of the power lines PL to receive a second power voltage. The first power voltage may have a voltage level higher than a voltage level of the second power voltage.

The light emitting element LD is connected between an anode electrode AE and a cathode electrode CE. The anode electrode AE may be connected to the first power voltage node VDDN through the sub-pixel circuit SPC. For example, the anode electrode AE may be connected to the first power voltage node VDDN through one or more transistors included in the sub-pixel circuit SPC. The cathode electrode CE may be connected to the second power voltage node VSSN. The light emitting element LD may emit light according to a current flowing from the anode electrode AE to the cathode electrode CE.

The sub-pixel circuit SPC may be connected to an ith gate line GLi from among the first to mth gate lines GL1 to GLm described above with reference to FIG. 1, and a jth data line DLj from among the first to nth data lines DL1 to DLn. In response to a gate signal received through the ith gate line GLi, the sub-pixel circuit SPC may control the light emitting element LD to emit light according to a data signal received through the jth data line DLj. In some embodiments, the sub-pixel circuit SPC may be further connected to the pixel control lines PXCL described above with reference to FIG. 1. The sub-pixel circuit SPC may control the light emitting element LD in further response to control signals received through the pixel control lines PXCL.

For such operations, the sub-pixel circuit SPC may include circuit elements, for example, such as a plurality of transistors and one or more capacitors.

The transistors of the sub-pixel circuit SPC may include P-type transistors and/or N-type transistors. In some embodiments, the transistors of the sub-pixel circuit SPC may include a Metal Oxide Silicon Field Effect Transistor (MOSFET). In some embodiments, the transistors of the sub-pixel circuit SPC may include an amorphous silicon semiconductor, a monocrystalline silicon semiconductor, polycrystalline silicon semiconductor, an oxide semiconductor, and/or the like.

Figure 3:
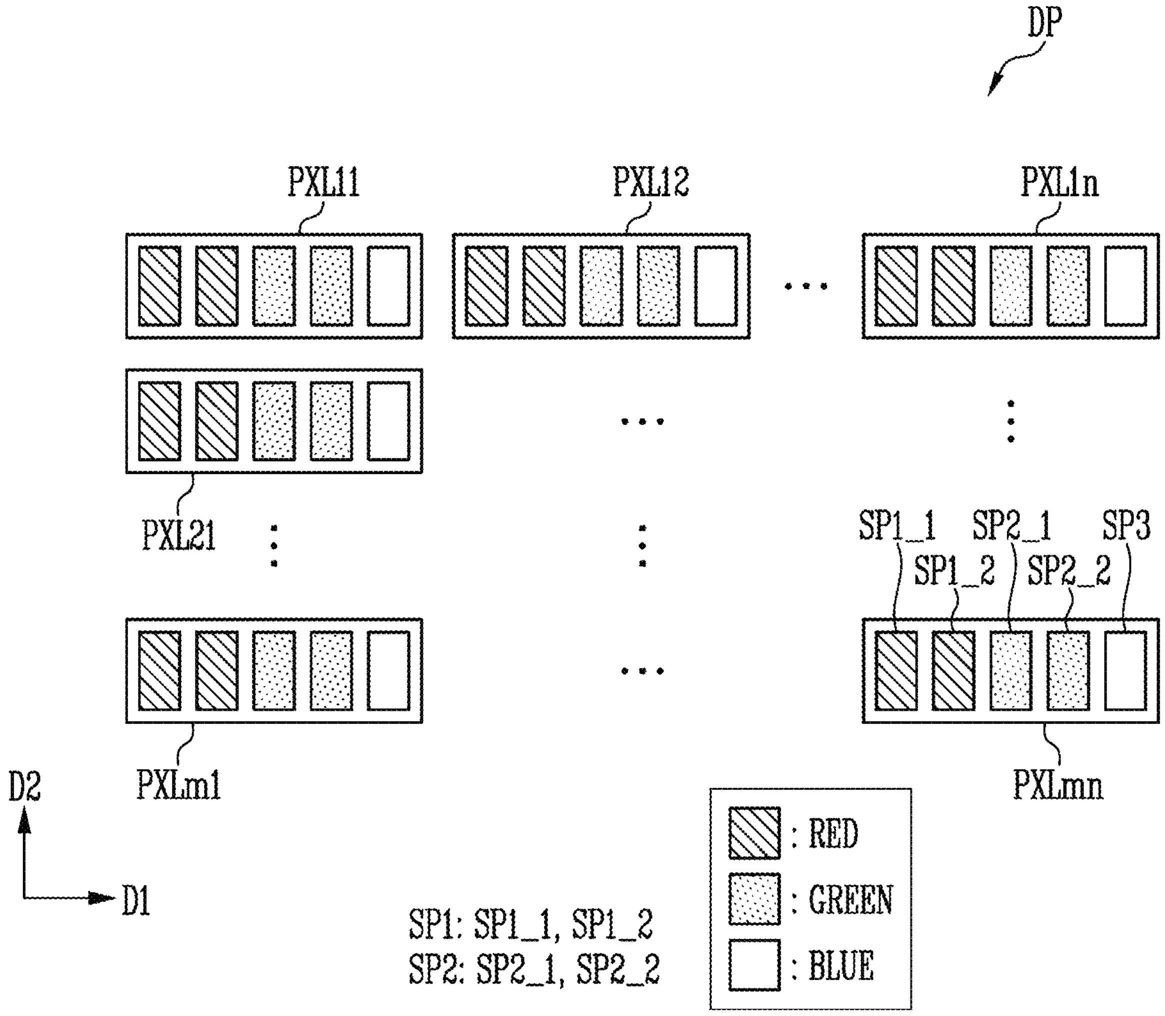
FIG. 3 is a plan view illustrating pixels of a display panel in accordance with some embodiments of the present disclosure.
Figure 4:
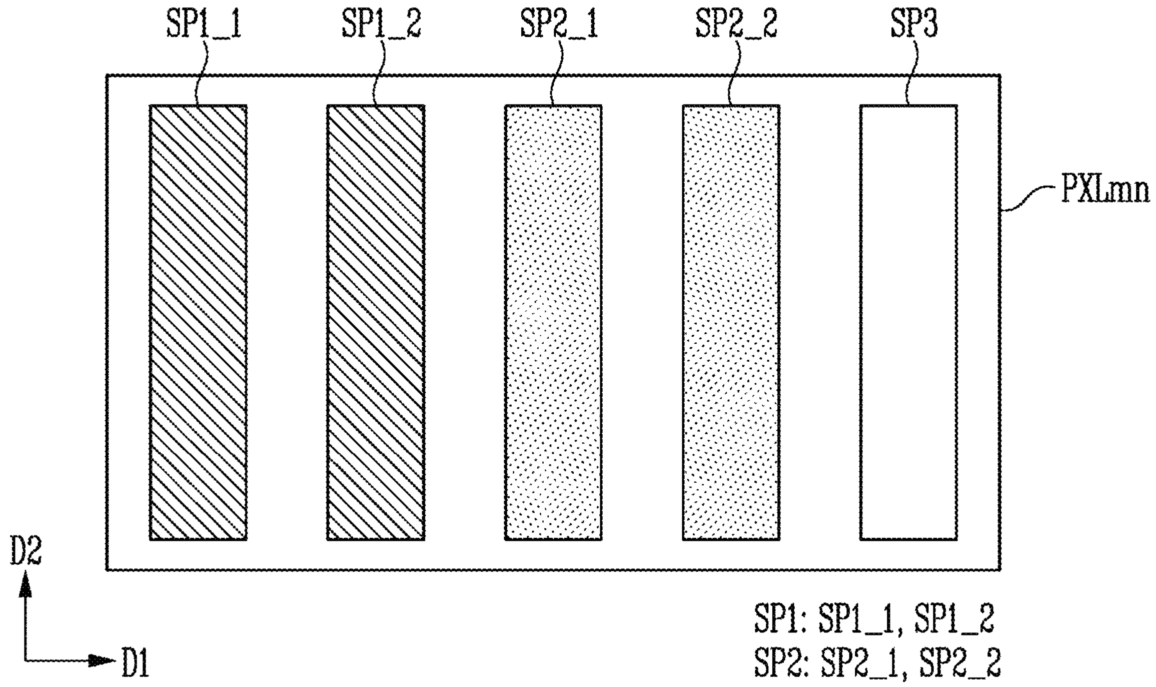
FIG. 4 is a plan view illustrating a pixel from among the pixels of FIG. 3, according to an embodiment.
Figure 5:
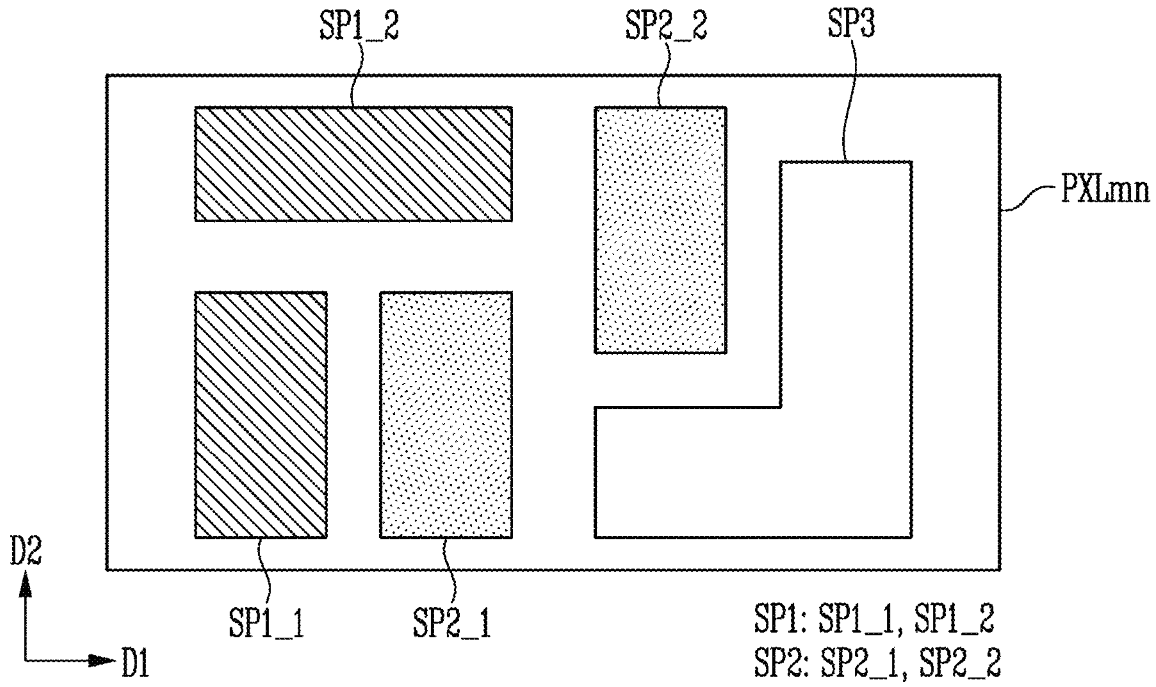
FIG. 5 is a plan view illustrating a pixel from among the pixels of FIG. 3, according to an embodiment.
Figure 6:
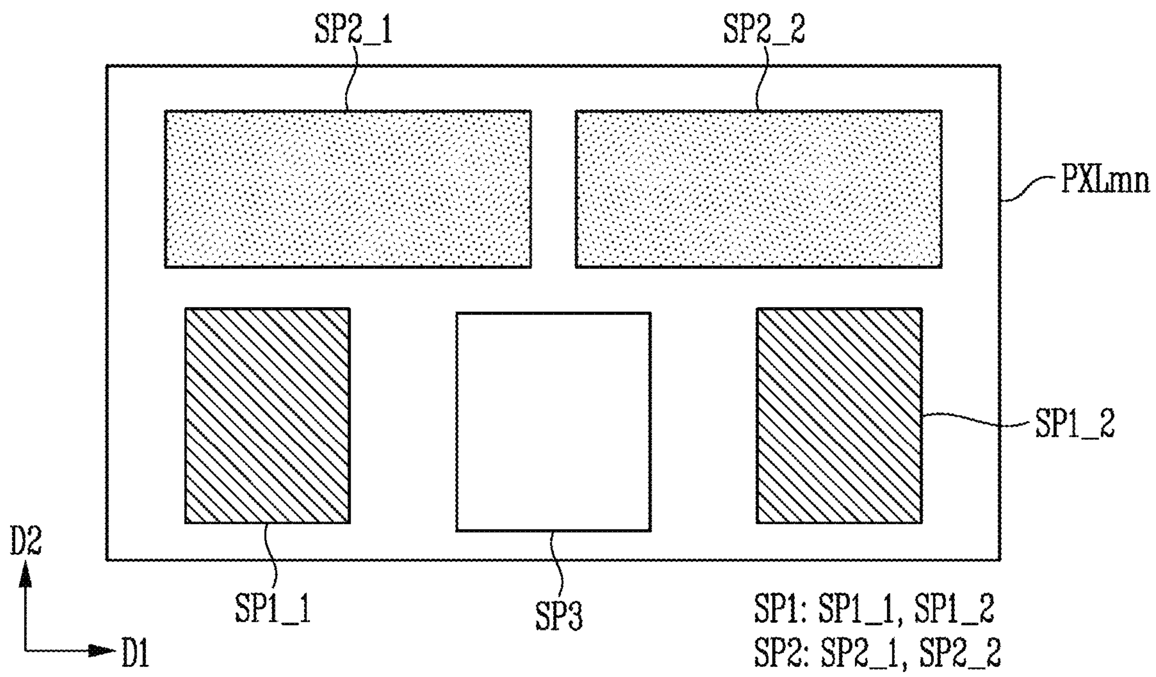
FIG. 6 is a plan view illustrating a pixel from among the pixels of FIG. 3, according to an embodiment.
Figure 7:
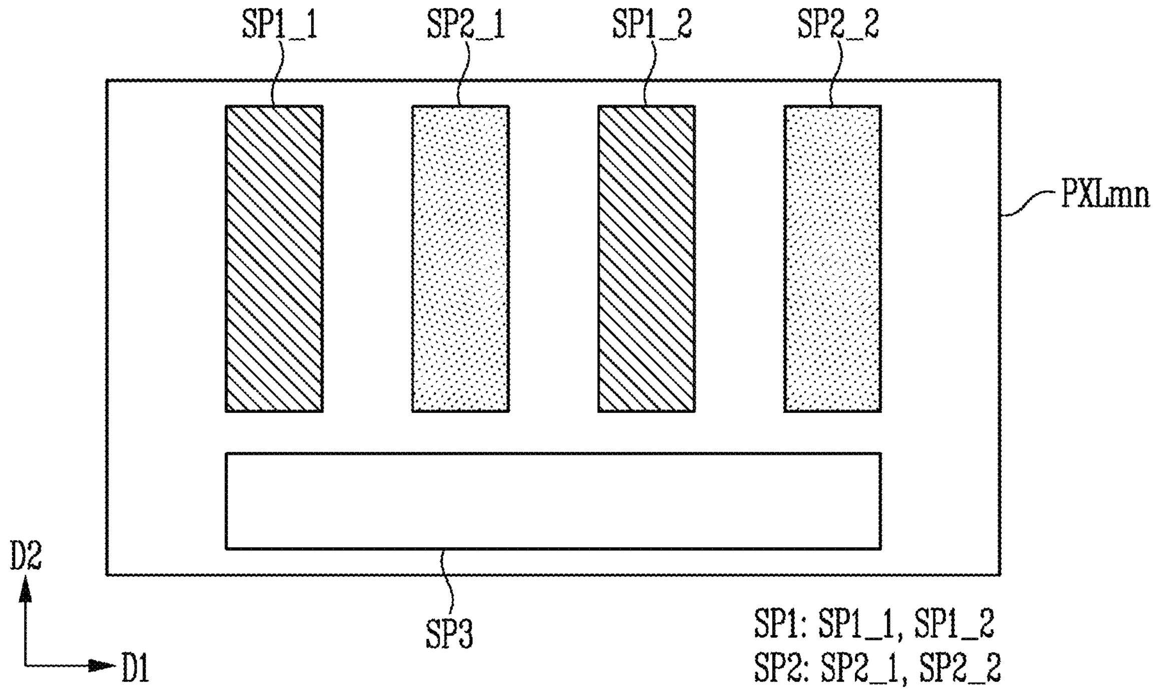
FIG. 7 is a plan view illustrating a pixel from among the pixels of FIG. 3, according to an embodiment.

FIG. 3 is a plan view illustrating pixels of a display panel in accordance with some embodiments of the present disclosure. FIG. 4 is a plan view illustrating a pixel from among the pixels of FIG. 3, according to an embodiment. FIG. 5 is a plan view illustrating a pixel from among the pixels of FIG. 3, according to an embodiment. FIG. 6 is a plan view illustrating a pixel from among the pixels of FIG. 3, according to an embodiment. FIG. 7 is a plan view illustrating a pixel from among the pixels of FIG. 3, according to an embodiment. For example, FIGS. 4 to 7 may illustrate various examples of an mn-th pixel from among the pixels of FIG. 3.

Referring to FIG. 3, a plurality of pixels PXL (e.g., see FIG. 1) may be disposed in the display panel DP in accordance with one or more embodiments of the present disclosure. For example, the pixels PXL disposed in the display panel DP may be arranged along a first direction D1 and/or a second direction D2. The display panel DP shown in FIG. 3 may correspond to the display panel DP described above with reference to FIG. 1.

Each of the plurality of pixels PXL may include one or more sub-pixels SP1, SP2, and SP3. For example, the mn-th pixel PXLmn may include first sub-pixels SP1, second sub-pixels SP2, and a third sub-pixel SP3. Hereinafter, for convenience of illustration, the mn-th pixel PXLmn disposed on an mth row and an nth column may be mainly described in more detail.

The first sub-pixels SP1, the second sub-pixels SP2, and the third sub-pixel SP3 may have a quadrangular shape. However, the present disclosure is not limited thereto. For example, the first sub-pixels SP1, the second sub-pixels SP2, and the third sub-pixel SP3 may have a rhombic shape, a circular shape, a triangular shape, or the like.

The first sub-pixels SP1 may include a (1_1)th sub-pixel SP1_1 and a (1_2)th sub-pixel SP1_2. The second sub-pixels SP2 may include a (2_1)th sub-pixel SP2_1 and a (2-2)th sub-pixel SP2_2.

The first sub-pixels SP1, the second sub-pixels SP2, and the third sub-pixel SP3 may emit light of different colors from each other. In some embodiments, the first sub-pixels SP1 may emit light of a red color. The second sub-pixels SP2 may emit light of a green color. The third sub-pixel SP3 may emit light of a blue color. However, the present disclosure is not limited thereto.

The first sub-pixels SP1 may emit light in a red wavelength band. For example, the first sub-pixels SP1 may emit light having a wavelength of about 630 to 750 nm (nanometer).

The second sub-pixels SP2 may emit light in a green wavelength band. For example, the second sub-pixels SP2 may emit light having a wavelength of about 495 to 570 nm.

The third sub-pixel SP3 may emit light in a blue wavelength band. For example, the third sub-pixels SP3 may emit light having a wavelength of about 450 to 495 nm.

Referring to FIG. 4, the first sub-pixels SP1, the second sub-pixels SP2, and the third sub-pixel SP3 may be sequentially arranged along the first direction D1. For example, the (1_1)th sub-pixel SP1_1, the (1_2)th sub-pixel SP1_2, the (2_1)th sub-pixel SP2_1, the (2_2)th sub-pixel SP2_2, and the third sub-pixel SP3 may be sequentially arranged along the first direction D1. In other words, the (1_2)th sub-pixel SP1_2 may be disposed between the (1_1)th sub-pixel SP1_1 and the (2_1)th sub-pixel SP2_1. In addition, the (2_2)th sub-pixel SP2_2 may be disposed between the (2_1)th sub-pixel SP2_1 and the third sub-pixel SP3.

In some embodiments, each of the first sub-pixels SP1, the second sub-pixels SP2, and the third sub-pixel SP3 may have short sides extending in the first direction D1, and long sides extending in the second direction D2. However, the present disclosure is not limited thereto.

Each of the (1_1)th sub-pixel SP1_1, the (1_2)th sub-pixel SP1_2, the (2_1)th sub-pixel SP2_1, the (2_2)th sub-pixel SP2_2, and the third sub-pixel SP3 may be designated as an emission area. For example, each of the (1_1)th sub-pixel SP1_1, the (1_2)th sub-pixel SP1_2, the (2_1)th sub-pixel SP2_1, the (2_2)th sub-pixel SP2_2, and the third sub-pixel SP3 may correspond to (e.g., may be) an opening in which light is emitted.

Referring to FIG. 5, the (1_1)th sub-pixel SP1_1 and the (2_1)th sub-pixel SP2_1 may be disposed to be adjacent to each other in the first direction D1. Each of the (1_1)th sub-pixel SP1_1 and the (2_1)th sub-pixel SP2_1 may have long sides extending in the second direction D2, and short sides extending in the first direction D1.

The (1_2)th sub-pixel SP1_2 and the (2_2)th sub-pixel SP2_1 may be disposed to be adjacent to each other in the first direction D1. The (1_2)th sub-pixel SP1_2 may have long sides extending in the first direction D1, and short sides extending in the second direction D2. The (2_2)th sub-pixel SP2_2 may have long sides extending in the second direction D2, and short sides extending in the first direction D1.

The (1_2)th sub-pixel SP1_2 may be disposed to be adjacent to the (1_1)th sub-pixel SP1_1 and the (2_1)th sub-pixel SP2_1 in an opposite direction of the second direction D2. The (2_2)th sub-pixel SP2_2 may be disposed adjacent to the (1_2)th sub-pixel SP1_2 and the (2_1)th sub-pixel SP2_1 in an opposite direction of the first direction D1.

The third sub-pixel SP3 may surround (e.g., around a periphery of) at least a portion of the (2_2)th sub-pixel SP2_2. For example, the third sub-pixel SP3 may have an 'L' shape that is inverted in the first direction D1, and may surround (e.g., around a periphery of) a partial surface or side of the (2_2)th sub-pixel SP2_2.

Referring to FIG. 6, the (2_1)th sub-pixel and the (2_2)th sub-pixel SP2_2 may be disposed to be adjacent to each other in the first direction D1. Each of the (2_1)th sub-pixel and the (2_2)th sub-pixel SP2_2 may have long sides extending in the first direction D1, and short sides extending in the second direction D2.

The (1_1)th sub-pixel SP1_1 may be disposed to be adjacent to the (2_1)th sub-pixel SP2_1 in the second direction D2. The (1_2)th sub-pixel SP1_2 may be disposed to be adjacent to the (2_2)th sub-pixel SP2_2 in the second direction D2. Each of the (1_1)th sub-pixel SP1_1 and the (1_2)th sub-pixel SP1_2 may have short sides extending in the first direction D1, and long sides extending in the second direction D2.

The third sub-pixel SP3 may be disposed between the (1_1)th sub-pixel SP1_1 and the (1_2)th sub-pixel SP1_2. The third sub-pixel SP3 may have short sides extending in the first direction D1, and long sides extending in the second direction D2.

Referring to FIG. 7, the (1_1)th sub-pixel SP1_1, the (2_1)th sub-pixel SP2_1, the (1_2)th sub-pixel SP1_2, and the (2_2)th sub-pixel SP2_2 may be sequentially arranged along the first direction D1. The (1_1)th sub-pixel SP1_1 may be disposed to be adjacent to the (2_1)th sub-pixel SP2_1 in the first direction D1. In addition, the (1_2)th sub-pixel SP1_2 may be disposed to be adjacent to the (2_2)th sub-pixel SP2_2 in the first direction D1. Each of the (1_1)th sub-pixel SP1_1, the (2_1)th sub-pixel SP2_1, the (1_2)th sub-pixel SP1_2, and the (2_2)th sub-pixel SP2_2 may have short sides extending in the first direction D1, and long sides extending in the second direction D2.

The third sub-pixel SP3 may be disposed to be adjacent to the (1_1)th sub-pixel SP1_1, the (2_1)th sub-pixel SP2_1, the (1_2)th sub-pixel SP1_2, and the (2_2)th sub-pixel SP2_2 in the second direction D2. The third sub-pixel SP3 may have long sides extending in the first direction D1, and short sides extending in the second direction D2.

Figure 8:
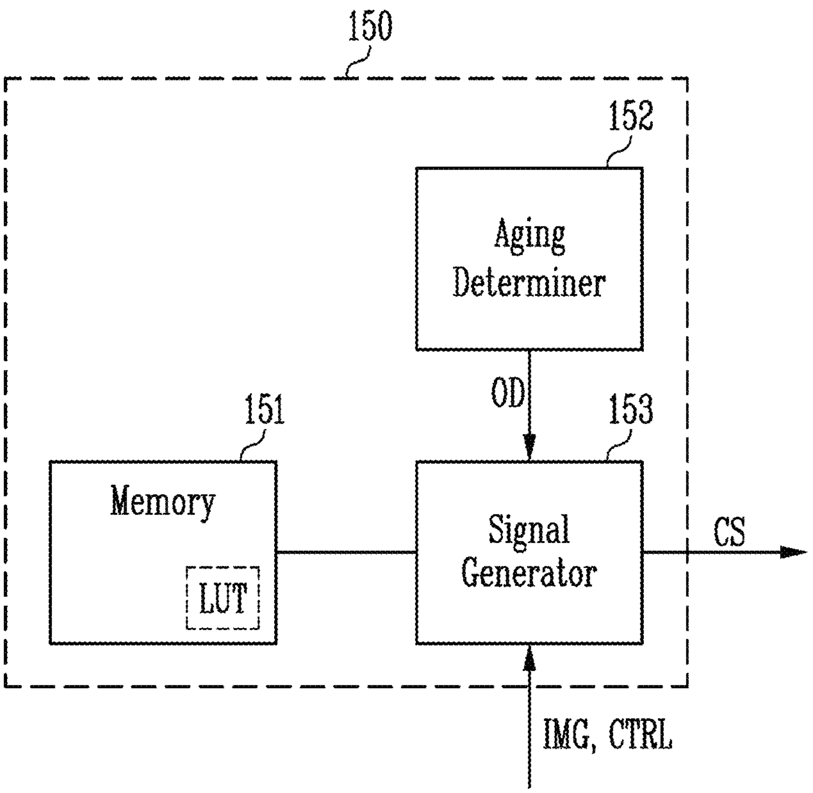
FIG. 8 is a block diagram illustrating a main controller of FIG. 1, according to an embodiment.
Figure 9:
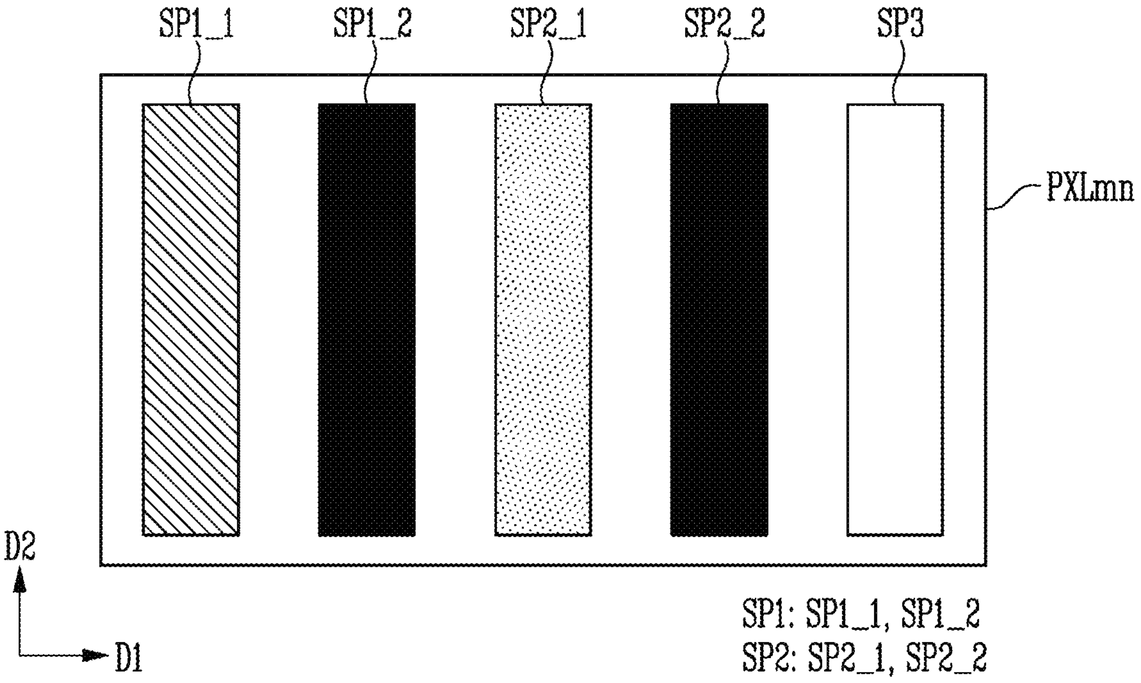
FIG. 9 is a plan view illustrating a state in which sub-pixels of the pixel of FIG. 4 are driven during a first period.
Figure 10:
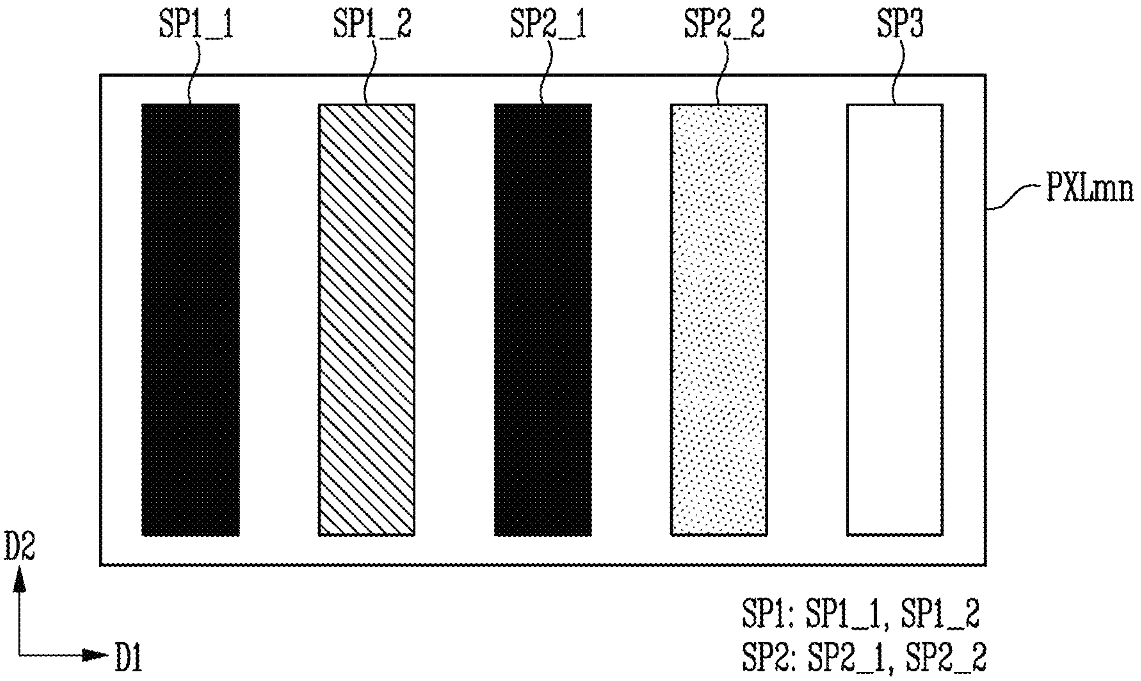
FIG. 10 is a plan view illustrating a state in which the sub-pixels of the pixel of FIG. 4 are driven during a second period.
Figure 11:
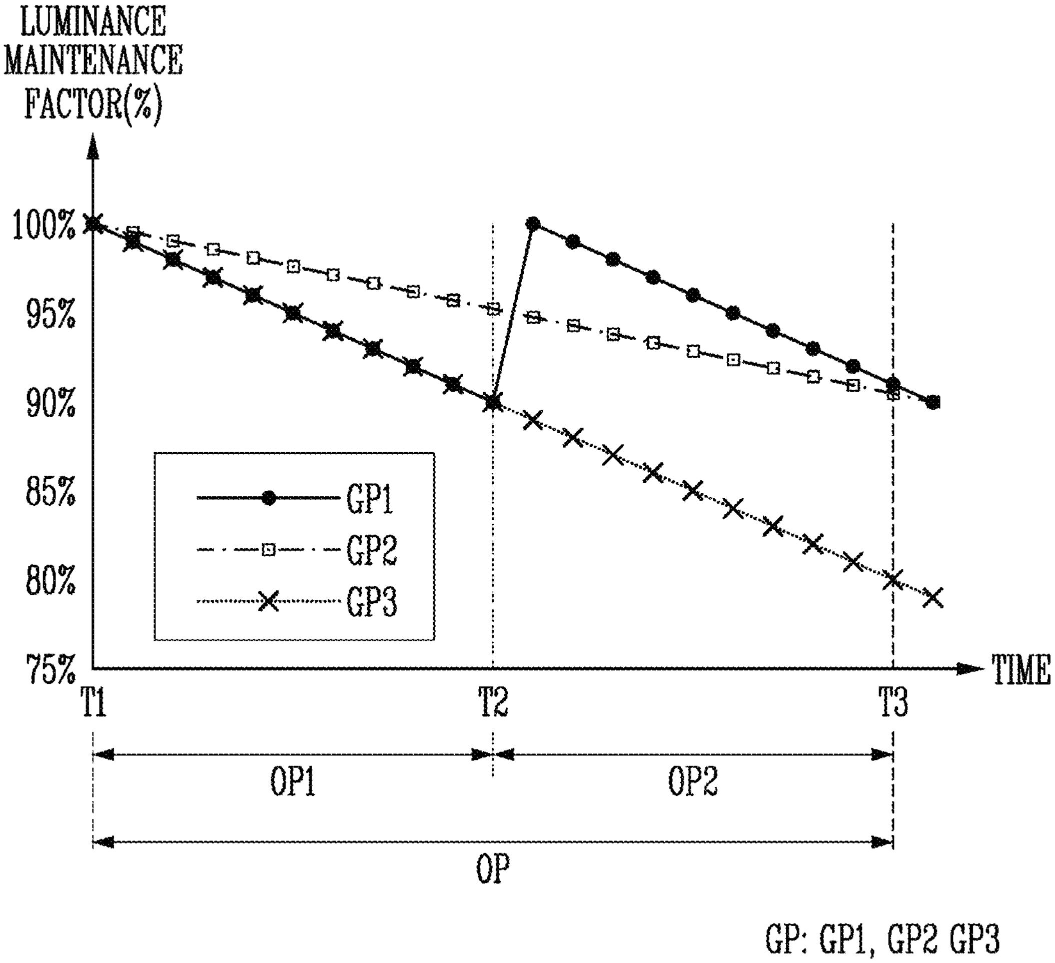
FIG. 11 is a diagram illustrating luminance maintenance factor graphs of a pixel in accordance with a first embodiment, a second embodiment, and a comparative example.

FIG. 8 is a block diagram illustrating the main controller of FIG. 1, according to an embodiment. FIG. 9 is a plan view illustrating a state in which the sub-pixels of the pixel of FIG. 4 are driven during a first period. FIG. 10 is a plan view illustrating a state in which the sub-pixels of the pixel of FIG. 4 are driven during a second period. FIG. 11 is a diagram illustrating luminance maintenance factor graphs of a pixel in accordance with a first embodiment, a second embodiment, and a comparative example.

Referring to FIGS. 8 to 10, the main controller 150 may include a memory 151, an aging determiner 152, and a signal generator 153.

The memory 151 may include a lookup table in which aging data of each of sub-pixels SP (e.g., see FIG. 1) included in a pixel PXL is stored. For example, ages of the first sub-pixels SP1, the second sub-pixels SP2, and the third sub-pixel SP3 may be different from one another. Aging data on the age of each of the first sub-pixels SP1, the second sub-pixels SP2, and the third sub-pixel SP3 may be stored in the lookup table. The aging data may include information on a threshold age of each of the sub-pixels SP. The threshold age may be a time point at which each of the sub-pixels SP does not emit light by an intended luminance. For example, this will be described in more detail below with reference to FIGS. 8 to 10 together with FIG. 11. The threshold age may be a time point at which the luminance maintenance factor of each of the sub-pixels SP decreases to 90% or less.

The aging determiner 152 may accumulate a time for which each of sub-pixels SP included in pixels PXL is driven. For example, the aging determiner 152 may measure a time for which the pixels PXL are driven up to a specific time point. Accordingly, the aging determiner 152 may generate driving data OD on information of a driving time of each of the sub-pixels. The aging determiner 152 may transfer the driving data OD to the signal generator 153.

The signal generator 153 may read data of the lookup table included in the memory 151. For example, the signal generator 153 may read the aging data included in the lookup table. The signal generator 153 may be supplied with the driving data OD. Accordingly, the signal generator 153 may convert an input control signal CTRL into an output control signal CS based on the aging data and the driving data OD.

Referring to FIGS. 9 and 10, at least one of the sub-pixels SP (e.g., see FIG. 1) of the mn-th pixel PXLmn may be driven, and at least another of the sub-pixels SP of the mn-th pixel PXLmn may not be driven. For example, during a first period P1, the (1_1)th sub-pixel SP1_1, the (2_1)th sub-pixel SP2_1, and the third sub-pixel SP3 may be driven. During the first period P1, the (1_2)th sub-pixel SP1_2 and the (2_2)th sub-pixel SP2_2 may not be driven. In addition, during a second period P2, the (1_2)th sub-pixel SP1_2, the (2_2)th sub-pixel SP2_2, and the third sub-pixel SP3 may be driven. During the second period P2, the (1_1)th sub-pixel SP1_1 and the (2_1)th sub-pixel SP2_1 may not be driven.

Hereinafter, for convenience of illustration, an embodiment in which the sub-pixels of the mn-th sub-pixel described above with reference to FIG. 4 are driven will be described in more detail as a representative example. However, the present disclosure is not limited thereto. For example, the sub-pixels of the mn-th pixel described above with reference to each of FIGS. 5 to 7 may also be equally or substantially equally applied.

In accordance with a first embodiment, when only any one of two or more sub-pixels SP (e.g., see FIG. 1) expressing the same color as each other is driven, and the corresponding sub-pixel SP is driven up to a threshold age thereof, another of the two or more sub-pixels SP (e.g., see FIG. 1) expressing the same color as each other may be driven. For example, during the first period P1, the (1_1)th sub-pixel SP1_1, the (2_1)th sub-pixel SP2_1, and the third sub-pixel SP3 may be driven, and the (1_2)th sub-pixel SP1_2 and the (2_2)th sub-pixel SP2_2 may not be driven. Thereafter, during the second period P2, the (1_2)th sub-pixel SP1_2, the (2_2)th sub-pixel SP2_2, and the third sub-pixel SP3 may be driven, and the (1_1)th sub-pixel SP1_1 and the (2_1)th sub-pixel SP2_1 may not be driven.

In other words, the signal generator 153 may generate an output control signal CS so that the (1_1)th sub-pixel SP1_1 and the (2_1)th sub-pixel SP2_1 are driven during the first period P1. The first period P1 may be a time interval that is equal to or substantially equal to a threshold age of each of the (1_1)th sub-pixel SP1_1 and the (2_1)th sub-pixel SP2_1. In other words, the signal generator 153 may determine the first period P1 to correspond to the threshold age of each of the (1_1)th sub-pixel SP1_1 and the (2_1)th sub-pixel SP2_1. Afterwards, the signal generator 153 may generate an output control signal CS so that the (1_2)th sub-pixel SP1_2 and the (2_2)th sub-pixel SP2_2 are driven in the second period P2 posterior to the first period P1.

In accordance with a second embodiment, each of the first period P1 and the second period P2 may correspond to one frame. For example, the (1_1)th sub-pixel SP1_1 and the (1_2)th sub-pixel SP1_2 may be alternately driven for each frame. In addition, the (2_1)th sub-pixel SP2_1 and the (2_2)th sub-pixel SP2_2 may be alternately driven for each frame.

In other words, the signal generator 153 may determine the first period P1 as a single frame. The signal generator 153 may determine, as the second period P2, a next frame posterior to the first period P1. Accordingly, the signal generator 153 may generate an output control signal CS so that the (1_1)th sub-pixel SP1_1 and the (2_1)th sub-pixel SP2_1 are driven in the first period P1 as the single frame, and the (1_2)th sub-pixel SP1_2 and the (2_2)th sub-pixel SP2_2 are driven in the second period P2 as the next frame.

The (1_1)th sub-pixel SP1_1 and the (1_2)th sub-pixel SP1_2 may emit light having the same or substantially the same luminance as each other. In other words, even when a luminance expressed by the pixel PX is not changed, the (1_1)th sub-pixel SP1_1 and the (1_2)th sub-pixel SP1_2 may be driven in the above-described manner. In addition, the (2_1)th sub-pixel SP2_1 and the (2_2)th sub-pixel SP2_2 may emit light having the same or substantially the same luminance as each other.

Referring to FIG. 11, the luminance maintenance factor graphs GP representing luminance maintenance factors according to driving times of any one of the pixels PXL (e.g., see FIG. 4) are shown. For example, a luminance maintenance factor graph GP1 of a pixel in accordance with the first embodiment, a luminance maintenance factor graph GP2 of a pixel in accordance with the second embodiment, and a luminance maintenance factor graph GP3 of a pixel in accordance with a comparative example are illustrated in FIG. 11.

During a driving period OP, the luminance maintenance factor of the pixel PXL in accordance with the comparative example may continuously decrease. For example, a luminance maintenance factor of the pixel PXL in accordance with the comparative example at a second time point T2 may be 90%. In addition, a luminance maintenance factor of the pixel PXL in accordance with the comparative example at a third time point T3 may be 80%. A threshold age of the pixel PXL in accordance with the comparative example may be a time interval from a first time point T1 to the second time point T2.

In accordance with the first embodiment, the (1_1)th sub-pixel SP1_1, the (2_1)th sub-pixel SP2_1, and the third sub-pixel SP3 may be driven during a first driving period OP1. A luminance maintenance factor of the pixel PXL in accordance with the first embodiment at the second time point T2 may be 90%. The first driving period OP1 may correspond to the threshold age of each of the (1_1)th sub-pixel SP1_1 and the (2_1)th sub-pixel SP2_1. Afterwards, the (1_1)th sub-pixel SP1_1 and the (2_1)th sub-pixel SP2_1 may not be driven during a second driving period OP2. For example, the (1_1)th sub-pixel SP1_1 and the (2_1)th sub-pixel SP2_1 may not be driven from the second time point T2. Accordingly, in accordance with the first embodiment, the luminance maintenance factor of the pixel PXL may be maintained as 90% or more during the driving period OP. In the first embodiment, the first period P1 and the second period P2 may be the same or substantially the same as the first driving period OP1 and the second driving period OP2.

In accordance with the second embodiment, the (1_1)th sub-pixel SP1_1 and the (1_2)th sub-pixel SP1_2 may be alternately driven for each frame during the driving period OP. In addition, the (2_1)th sub-pixel SP2_1 and the (2_2)th sub-pixel SP2_2 may be alternately driven for each frame during the driving period OP. Accordingly, a luminance maintenance factor of the pixel PXL in accordance with the second embodiment may decrease with a relatively smaller slope as compared with the luminance maintenance factor of the pixel PXL in accordance with the first embodiment. For example, at the second time point T2, a luminance maintenance factor of the pixel PXL in accordance with the second embodiment may be 95%. On the other hand, at the second time point T2, the luminance maintenance factor of the pixel PXL in accordance with the first embodiment may be 90%. In other words, in accordance with the second embodiment, the luminance maintenance factor of the pixel PXL may be maintained as 90% or more during the driving period OP. In accordance with the second embodiment, the first period P1 and the second period P2 may be different from the first driving period OP1 and the second driving period OP2.

In accordance with an embodiment of the present disclosure, one or more sub-pixels (e.g., the (1_1)th sub-pixel SP1_1 and the (1_2)th sub-pixel SP1_2) expressing the same color as each other are disposed in the pixel PXL (e.g., see FIG. 1), so that the display device DD may display an image having an improved quality for a relatively longer time. In other words, the luminance maintenance factor of the pixel PX may be maintained relatively higher during the driving period OP. For example, a single sub-pixel SP (e.g., see FIG. 1) emitting light of a corresponding color may be disposed in one pixel PXL in a display device DD in accordance with the comparative example. An age of the pixel PXL may be determined by an age of any one of the sub-pixels SP. In other words, when any one of the sub-pixels SP is expired, the pixel PXL may be expired. On the other hand, in accordance with an embodiment of the present disclosure, the (1_1)th sub-pixel SP1_1 and the (1_2) sub-pixel SP1_2, which express light of the same color as each other, are disposed in the pixel PXL to be driven at different time points from each other. Accordingly, the age of the pixel PXL in accordance with each of the first and second embodiments may be relatively improved as compared with the comparative example in which the single sub-pixel SP is continuously driven.

Figure 12:
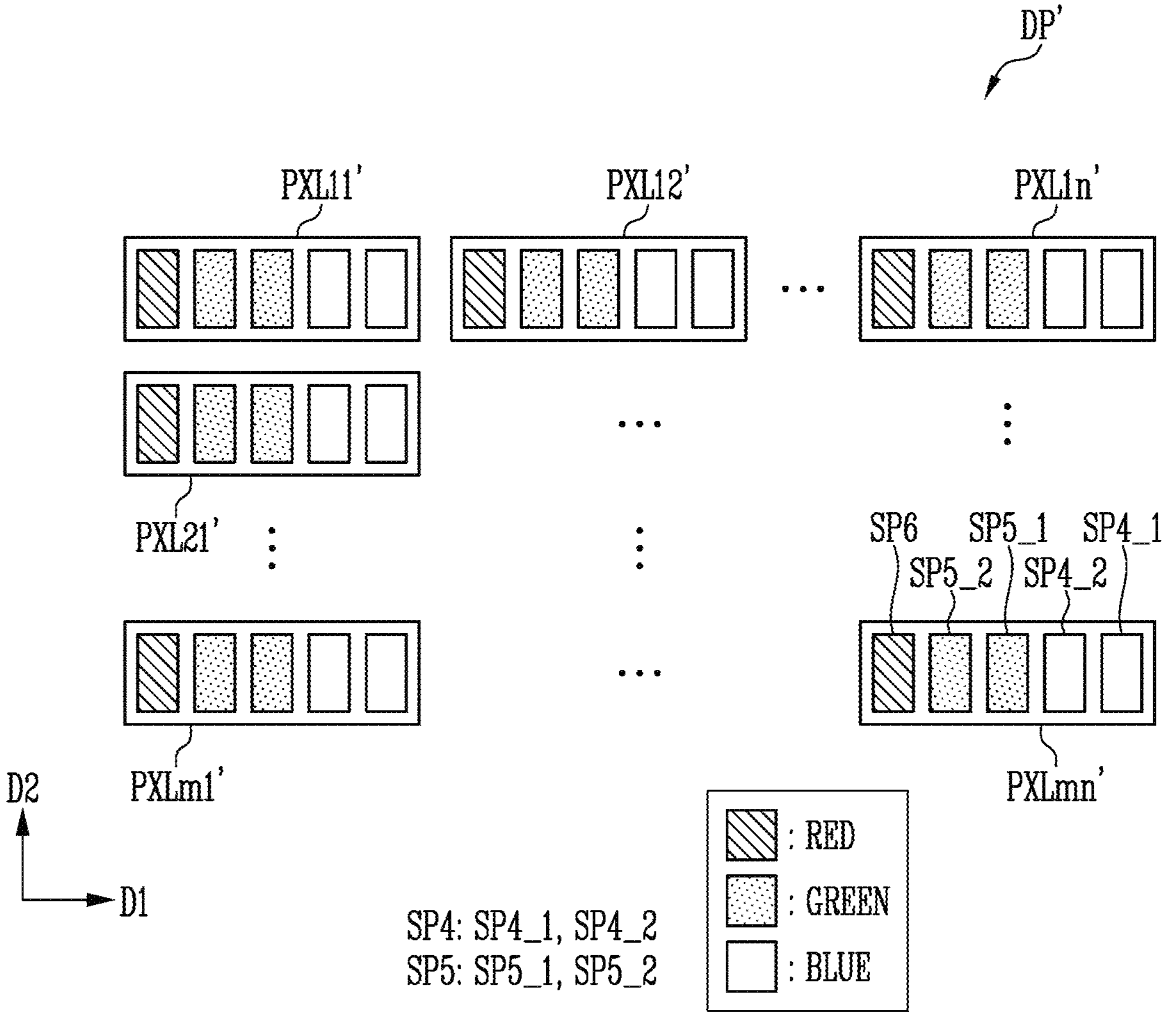
FIG. 12 is a plan view illustrating pixels of a display panel in accordance with some embodiments of the present disclosure.
Figure 13:
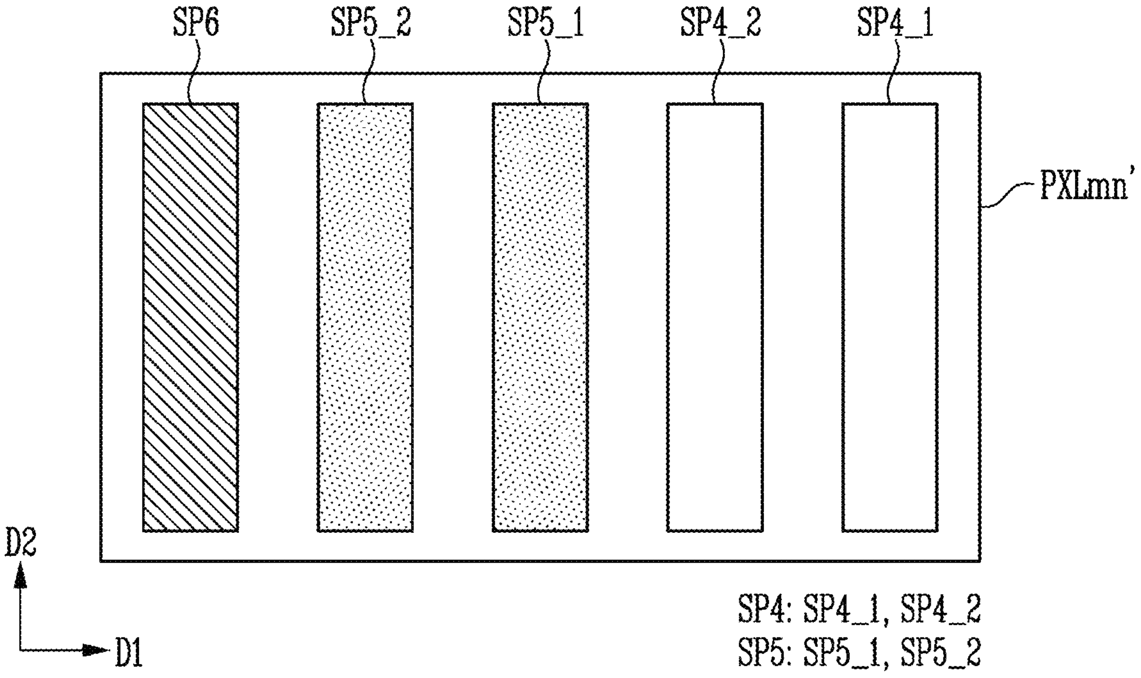
FIG. 13 is a plan view illustrating a pixel from among the pixels of FIG. 12, according to an embodiment.
Figure 14:
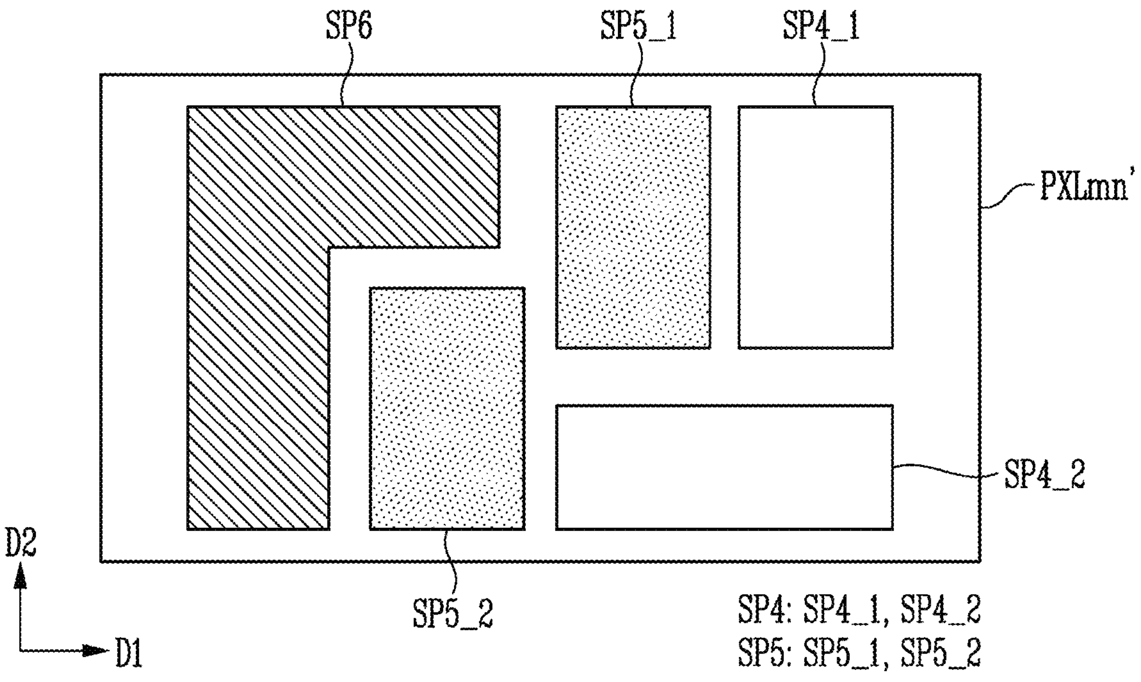
FIG. 14 is a plan view illustrating a pixel from among the pixels of FIG. 12, according to an embodiment.
Figure 15:
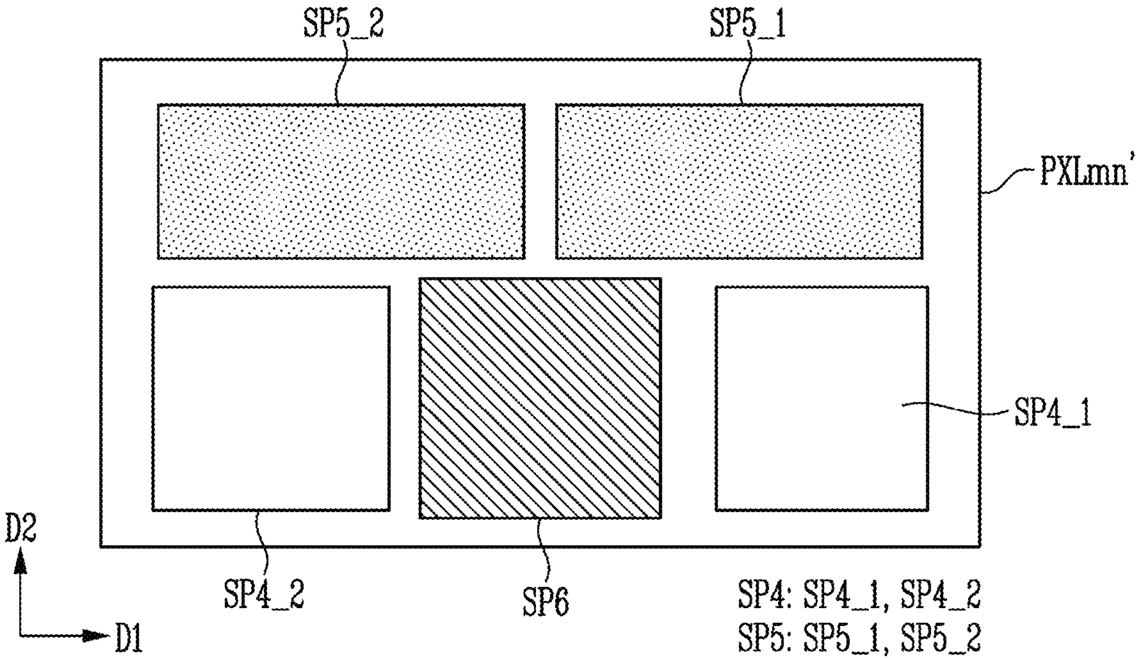
FIG. 15 is a plan view illustrating a pixel from among the pixels of FIG. 12, according to an embodiment.
Figure 16:
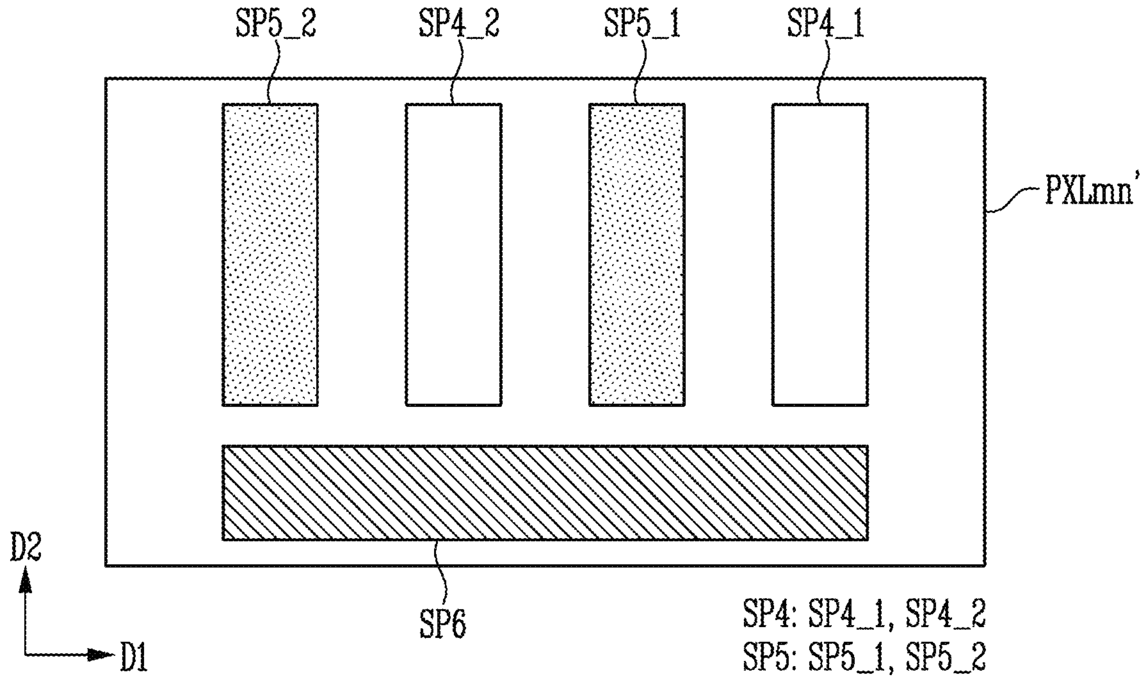
FIG. 16 is a plan view illustrating a pixel from among the pixels of FIG. 12, according to an embodiment.

FIG. 12 is a plan view illustrating pixels of a display panel in accordance with some embodiments of the present disclosure. FIG. 13 is a plan view illustrating a pixel from among the pixels of FIG. 12, according to an embodiment. FIG. 14 is a plan view illustrating a pixel from among the pixels of FIG. 12, according to an embodiment. FIG. 15 is a plan view illustrating a pixel from among the pixels of FIG. 12, according to an embodiment. FIG. 16 is a plan view illustrating a pixel from among the pixels of FIG. 12, according to an embodiment. For example, FIGS. 13 to 16 may illustrate various examples of an mn-th pixel from among the pixels of FIG. 12.

Referring to FIG. 12, a plurality of pixels PXL (e.g., see FIG. 1) may be disposed in a display panel DP' in accordance with embodiments of the present disclosure. The display panel DP' shown in FIG. 12 and the plurality of pixels PXL disposed in the display panel DP' may be the same or substantially the same as the display panel DP described above with reference to FIG. 4 and the plurality of pixels PXL disposed in the display panel DP. As such, redundant description thereof may not be repeated.

Each of the plurality of pixels PXL may include one or more sub-pixels SP4, SP5, and SP6. For example, the mn-th pixel PXLmn' may include fourth sub-pixels SP4, fifth sub-pixels SP5, and a sixth sub-pixel SP6. Hereinafter, for convenience of illustration, the mn-th pixel PXLmn' disposed on an mth row and an nth column may be mainly described in more detail.

The fourth sub-pixels SP4, the fifth sub-pixels SP5, and the sixth sub-pixel SP6 may have a quadrangular shape. However, the present disclosure is not limited thereto. For example, the fourth sub-pixels SP4, the fifth sub-pixels SP5, and the sixth sub-pixel SP6 may have a rhombic shape, a circular shape, a triangular shape, or the like.

The fourth sub-pixels SP4 may include a (4_1)th sub-pixel SP4_1 and a (4_2)th sub-pixel SP4_2. The fifth sub-pixels SP5 may include a (5_1)th sub-pixel SP5_1 and a (5_2)th sub-pixel SP5_2.

The fourth sub-pixels SP4, the fifth sub-pixels SP5, and the sixth sub-pixel SP6 may be driven in the same or substantially the same manner as those of the first sub-pixels SP1, the second sub-pixels SP2, and the third sub-pixel SP3 described above. For example, the (4_1)th sub-pixel SP4_1, the (5_1)th sub-pixel SP5_1, and the sixth sub-pixel SP6 may be driven in the first period P1 (e.g., see FIG. 9), and the (4_2)th sub-pixel SP4_2 and the (5_2)th sub-pixel SP5_2 may be driven in the second period P2.

The (4_1)th sub-pixel SP4_1 and the (4_2)th sub-pixel SP4_2 may emit light with the same or substantially the same luminance as each other. In other words, the (4_1)th sub-pixel SP4_1 and the (4_2)th sub-pixel SP4_2 may be driven in the above-described manner, even when a luminance expressed by the pixel PXL (e.g., see FIG. 1) is not changed. In addition, the (5_5)th sub-pixel SP5_1 and the (5_2)th sub-pixel SP5_2 may emit light with the same or substantially the same luminance as each other.

The fourth sub-pixels SP4, the fifth sub-pixels SP5, and the sixth sub-pixel SP6 may emit light of different colors from each other. In some embodiments, the fourth sub-pixels SP4 may emit light of a blue color. The fifth sub-pixels SP5 may emit light of a green color. The sixth sub-pixel SP6 may emit light of a red color. However, the present disclosure is not limited thereto.

Referring to FIG. 13, the fourth sub-pixels SP4, the fifth sub-pixels SP5, and the sixth sub-pixel SP6 may be sequentially disposed along the opposite direction of the first direction D1. For example, the (4_1)th sub-pixel SP4_1, the (4_2)th sub-pixel SP4_2, the (5_1)th sub-pixel SP5_1, the (5_2)th sub-pixel SP5_2, and the sixth sub-pixel SP6 may be sequentially disposed in the opposite direction of the first direction D1. In other words, the (4-2)th sub-pixel SP4_2 may be disposed between the (4_1)th sub-pixel SP4_1 and the (5_1)th sub-pixel SP5_1. In addition, the (5_2)th sub-pixel SP5_2 may be disposed between the (5_1)th sub-pixel SP5_1 and the sixth sub-pixel SP6.

Referring to FIG. 14, the (4_1)th sub-pixel SP4_1 and the (5_1)th sub-pixel SP5_1 may be disposed to be adjacent to each other in the first direction D1. The (4_2)th sub-pixel SP4_2 and the (5_2)th sub-pixel SP5_2 may be disposed to be adjacent to each other in the first direction D1.

The (4_2)th sub-pixel SP4_2 may be disposed to be adjacent to the (4_1)th sub-pixel SP4_1 and the (5_1)th sub-pixel SP5_1 in the second direction D2. The (5_2)th sub-pixel SP5_2 may be disposed to be adjacent to the (4_2)th sub-pixel SP4_2 and the (5_1)th sub-pixel SP5_1 in the first direction D1.

The sixth sub-pixel SP6 may surround (e.g., around a periphery of) at least a portion of the (5_2)th sub-pixel SP5_2. For example, the sixth sub-pixel SP6 may have an 'L' shape that is inverted in the second direction D2, and may surround (e.g., around a periphery of) a partial surface or side of the (5_2)th sub-pixel SP5_2.

Referring to FIG. 15, the (5_1)th sub-pixel SP5_1 and the (5_2)th sub-pixel SP5_2 may be disposed to be adjacent to each other in the first direction D1. The (4_1)th sub-pixel SP4_1 may be disposed to be adjacent to the (5_1)th sub-pixel SP5_1 in the second direction D2. The (4_2)th sub-pixel SP4_2 may be disposed to be adjacent to the (5_2)th sub-pixel SP5_2 in the second direction D2. The sixth sub-pixel SP6 may be disposed between the (4_1)th sub-pixel SP4_1 and the (4_2)th sub-pixel SP4_2.

Referring to FIG. 16, the (4_1)th sub-pixel SP4_1, the (5_1)th sub-pixel SP5_1, the (4_2)th sub-pixel SP4_2, and the (5_2)th sub-pixel SP5_2 may be sequentially arranged along the first direction D1. The (4_1)th sub-pixel SP4_1 may be disposed adjacent to the (5_1)th sub-pixel SP5_1 in the first direction D1. In addition, the (4_2)th sub-pixel SP4_2 may be disposed adjacent to the (5_2)th sub-pixel SP5_2 in the first direction D1. The sixth sub-pixel SP6 may be disposed to be adjacent to the (4_1)th sub-pixel SP4_1, the (5_1)th sub-pixel SP5_1, the (4_2)th sub-pixel SP4_2, and the (5_2)th sub-pixel SP5_2 in the second direction D2.

Figure 17:
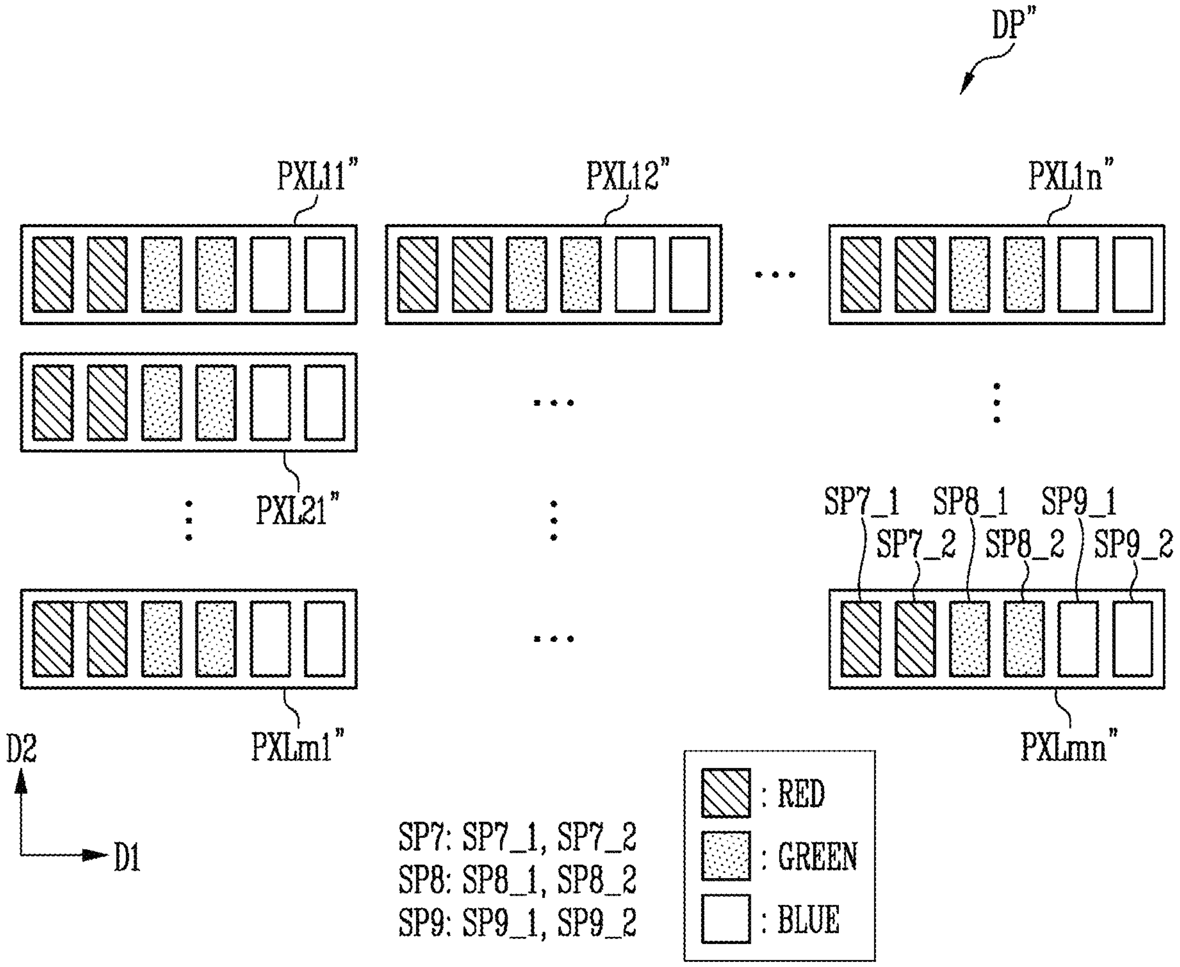
FIG. 17 is a plan view illustrating pixels of a display panel in accordance with some embodiments of the present disclosure.
Figure 18:
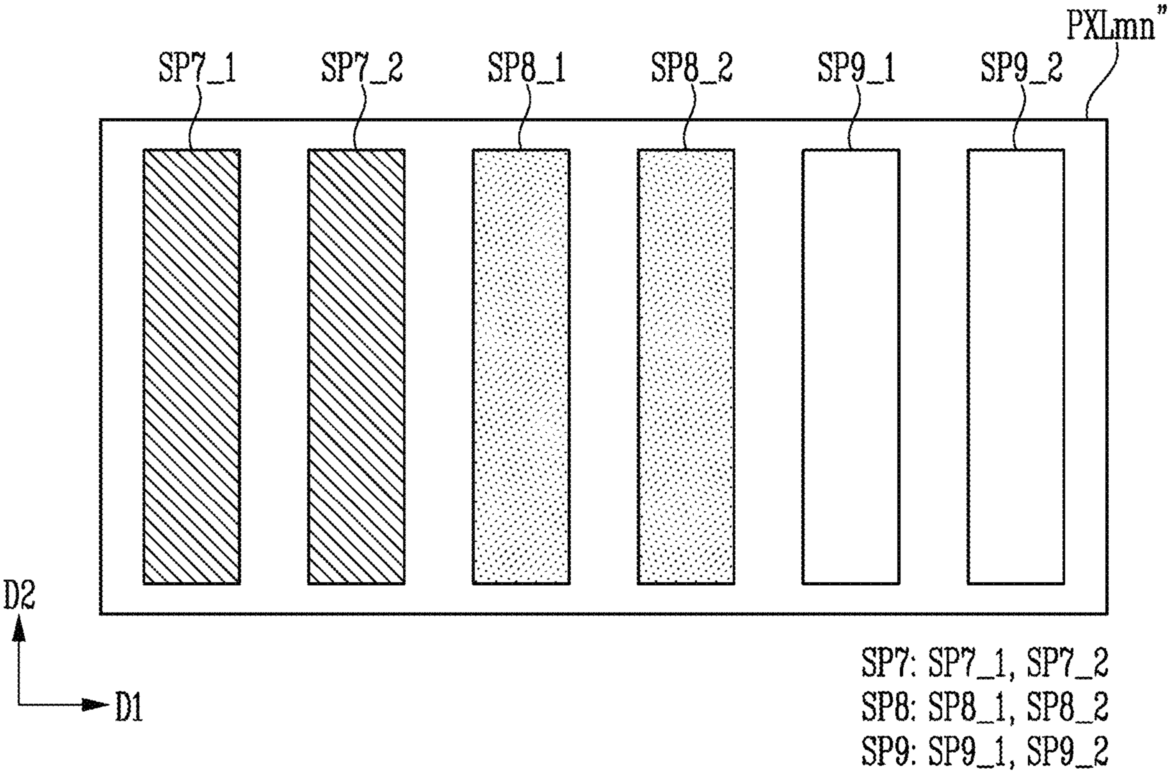
FIG. 18 is a plan view illustrating a pixel from among the pixels of FIG. 17, according to an embodiment.
Figure 19:
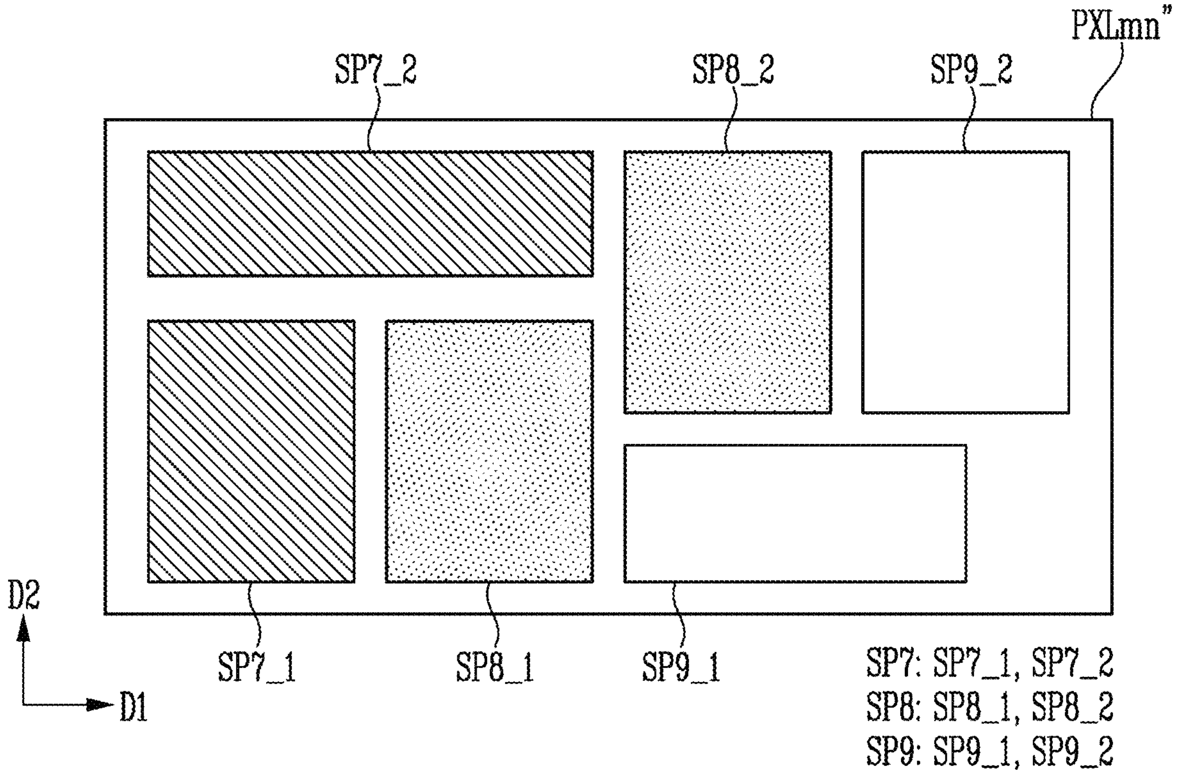
FIG. 19 is a plan view illustrating a pixel from among the pixels of FIG. 17, according to an embodiment.
Figure 20:
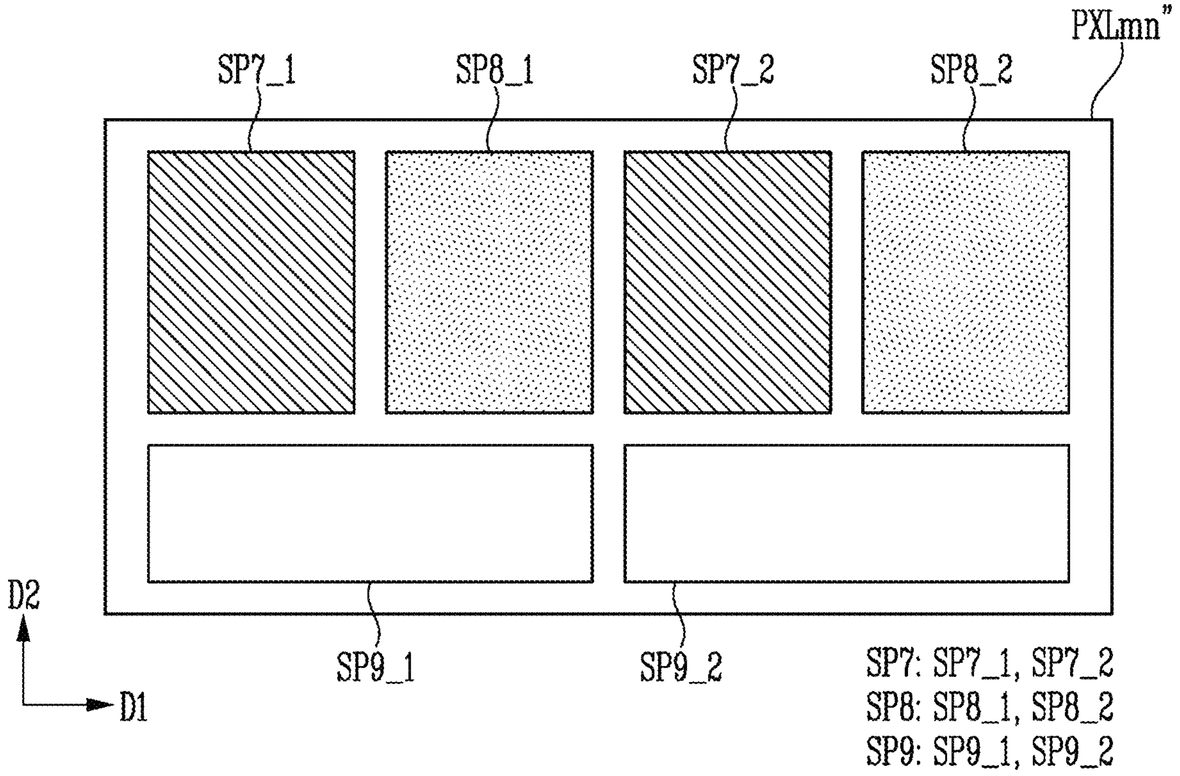
FIG. 20 is a plan view illustrating a pixel from among the pixels of FIG. 17, according to an embodiment.

FIG. 17 is a plan view illustrating pixels of a display panel in accordance with some embodiments of the present disclosure. FIG. 18 is a plan view illustrating a pixel from among the pixels of FIG. 17, according to an embodiment. FIG. 19 is a plan view illustrating a pixel from among the pixels of FIG. 17, according to an embodiment. FIG. 20 is a plan view illustrating a pixel from among the pixels of FIG. 17, according to an embodiment. For example, FIGS. 18 to 20 may illustrate various examples of an mn-th pixel from among the pixels of FIG. 17.

Referring to FIG. 17, a plurality of pixels PXL (e.g., see FIG. 1) may be disposed in a display panel DP" in accordance with embodiments of the present disclosure. The display panel DP" shown in FIG. 17 and the plurality of pixels PXL disposed in the display panel DP" may be the same or substantially the same as the display panel DP described above with reference to FIG. 4 and the plurality of pixels PXL disposed in the display panel DP. As such, redundant description thereof may not be repeated.

Each of the plurality of pixels PXL may include one or more sub-pixels SP1, SP2, and SP3. For example, the mn-th pixel PXLmn" may include seventh sub-pixels SP7, eighth sub-pixels SP8, and ninth sub-pixels SP9. Hereinafter, for convenience of illustration, the mn-th pixel PXLmn" disposed on an mth row and an nth column may be mainly described in more detail as a representative example.

The seventh sub-pixels SP7 may include a (7_1)th sub-pixel SP7_1 and a (7_2)th sub-pixel SP7_2. The eighth sub-pixels SP8 may include an (8_1)th sub-pixel SP8_1 and an (8_2)th sub-pixel SP8_2. The ninth sub-pixels SP9 may include a (9_1)th sub-pixel SP9_1 and an (9_2)th sub-pixel SP9_2. The seventh sub-pixels SP7 and the eighth sub-pixels SP8 may be the same or substantially the same as the first sub-pixels SP1 and the second sub-pixels SP2 described above with reference to FIG. 4. As such, redundant description thereof may not be repeated.

In addition, the seventh sub-pixels SP7 and the eighth sub-pixels SP8 may be driven in the same or substantially the same manner as those of the first sub-pixels SP1 and the second sub-pixels SP2. For example, the (7_1)th sub-pixel SP7_1 and the (8_1)th sub-pixel SP8_1 may be driven in the first period P1 (e.g., see FIG. 9). The (9_1)th sub-pixel SP9_1 may also be driven in the first period P1. In addition, the (7_2)th sub-pixel SP7_2 and the (8_2)th sub-pixel SP8_2 may be driven in the second period P2 (e.g., see FIG. 9). The (9_2)th sub-pixel SP9_2 may also be driven in the second period P2.

The (7_1)th sub-pixel SP7_1 and the (7_2)th sub-pixel SP7_2 may emit light with the same or substantially the same luminance as each other. In other words, the (7_1)th sub-pixel SP7_1 and the (7_2)th sub-pixel SP7_2 may be driven in the above-described manner, even when a luminance expressed by the pixel PXL is not changed. In addition, the (8_1)th sub-pixel SP8_1 and the (8_2)th sub-pixel SP8_2 may emit light with the same or substantially the same luminance as each other.

In some embodiments, the ninth sub-pixels SP9 may emit light of a blue color. For example, the ninth sub-pixels SP9 may emit light having a wavelength of about 450 to 495 nm. However, the present disclosure is not limited thereto.

Referring to FIG. 18, the seventh sub-pixels SP7, the eighth sub-pixels SP8, and the ninth sub-pixels SP9 may be sequentially arranged along the first direction D1. For example, the (7_1)th sub-pixel SP7_1, the (7_2)th sub-pixel SP7_2, the (8_1)th sub-pixel SP8_1, the (8_2)th sub-pixel SP8_2, the (9_1)th sub-pixel SP9_1, and the (9_2)th sub-pixel SP9_2 may be sequentially arranged along the first direction D1. In other words, the (7_2)th sub-pixel SP7_2 may be disposed between the (7_1)th sub-pixel SP7_1 and the (8_1)th sub-pixel SP8_1. In addition, the (8_2)th sub-pixel SP8_2 may be disposed between the (8_1)th sub-pixel SP8_1 and the (9_1)th sub-pixel SP9_1.

Referring to FIG. 19, the (7_1)th sub-pixel SP7_1 and the (8_1)th sub-pixel SP8_1 may be disposed to be adjacent to each other in the first direction D1. The (7_2)th sub-pixel SP7_2 may be disposed to be adjacent to the (7_1)th sub-pixel SP7_1 and the (8_1)th sub-pixel SP8_1 in the second direction D2. The (7_2)th sub-pixel SP7_2 may be disposed to be adjacent to the (8_2)th sub-pixel SP8_2 in the first direction D1. The (7_2)th sub-pixel SP7_2 may have long sides extending in the first direction D1, and short sides extending in the second direction D2.

The (8_2)th sub-pixel SP8_2 may be disposed adjacent to the (9_1)th sub-pixel SP9_1 in the second direction D2. The (8_2)th sub-pixel SP8_2 may be disposed adjacent to the (9_2)th sub-pixel SP9_2 in the first direction D1. The (8_2)th sub-pixel SP8_2 may have short sides extending in the first direction D1, and long sides extending in the second direction D2.

Referring to FIG. 20, the (7_1)th sub-pixel SP7_1, the (8_1)th sub-pixel SP8_1, the (7_2)th sub-pixel SP7_2, and the (8_2)th sub-pixel SP8_2 may be sequentially arranged along the first direction D1. The (7_1)th sub-pixel SP7_1 may be disposed adjacent to the (8_1)th sub-pixel SP8_1 in the first direction D1. In addition, the (7_2)th sub-pixel SP7_2 may be disposed adjacent to the (8_2)th sub-pixel SP8_2 in the first direction D1. Each of the (7_1)th sub-pixel SP7_1, the (8_1)th sub-pixel SP8_1, the (7_2)th sub-pixel SP7_2, and the (8_2)th sub-pixel SP8_2 may have short sides extending in the first direction D1, and long sides extending in the second direction D2.

The (9_1)th sub-pixel SP9_1 and the (9_2)th sub-pixel SP9_2 may be disposed to be adjacent to each other in the first direction D1. The (9_1)th sub-pixel SP9_1 may be disposed to be adjacent to the (7_1)th sub-pixel SP7_1 and the (8_1)th sub-pixel SP8_1 in the second direction D2. The (9_2)th sub-pixel SP9_2 may be disposed to be adjacent to the (7_2)th sub-pixel SP7_2 and the (8_2)th sub-pixel SP8_2 in the second direction D2. Each of the (9_1)th sub-pixel SP9_1 and the (9_2)th sub-pixel SP9_2 may have long sides extending in the first direction D1, and short sides extending in the second direction D2.

Figure 21:
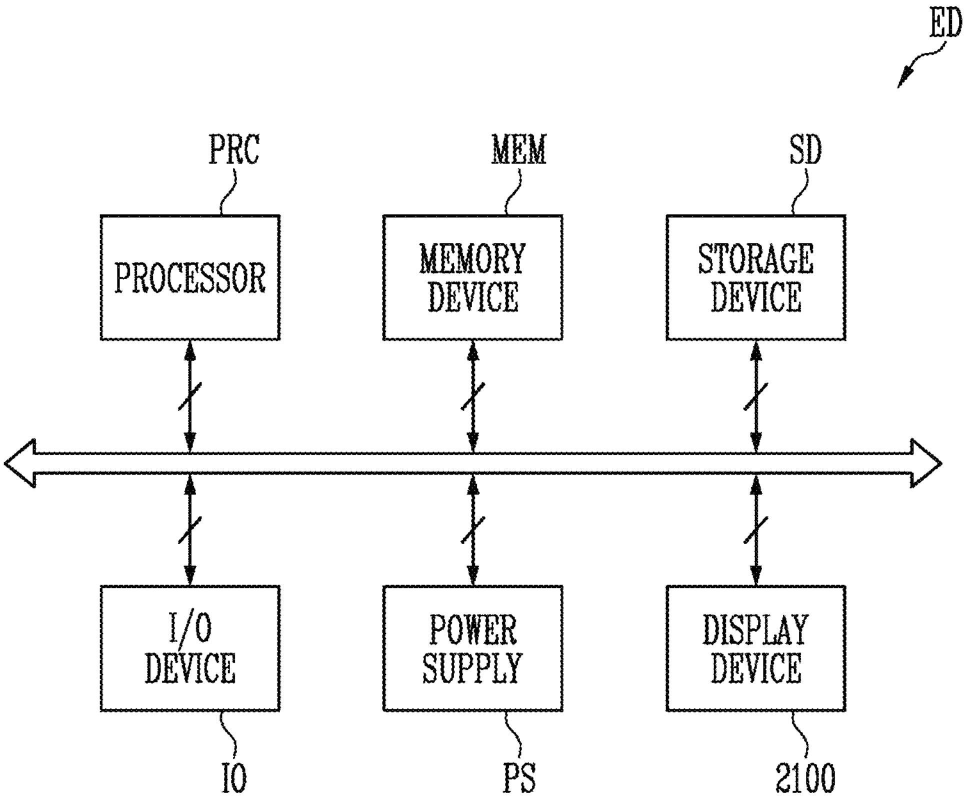
FIG. 21 is a block diagram illustrating an electronic device including a display device in accordance with some embodiments of the present disclosure.
Figure 22:
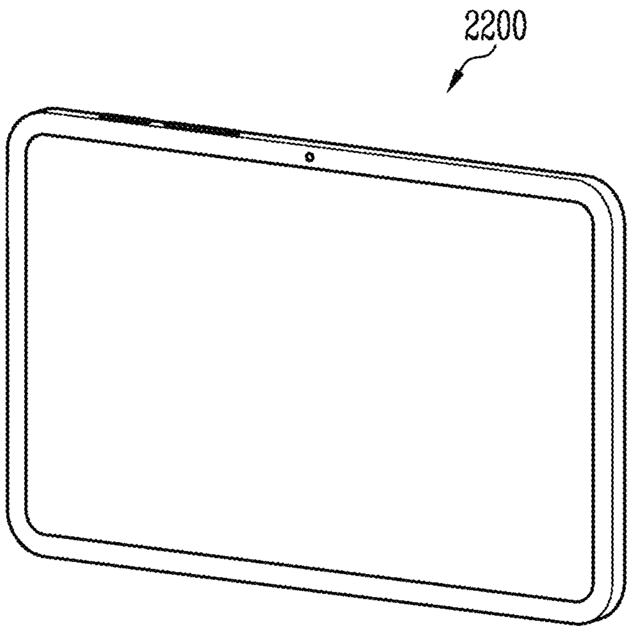
FIG. 22 is a perspective view illustrating an example in which the electronic device shown in FIG. 21 is implemented as a tablet personal computer (PC).
Figure 23:
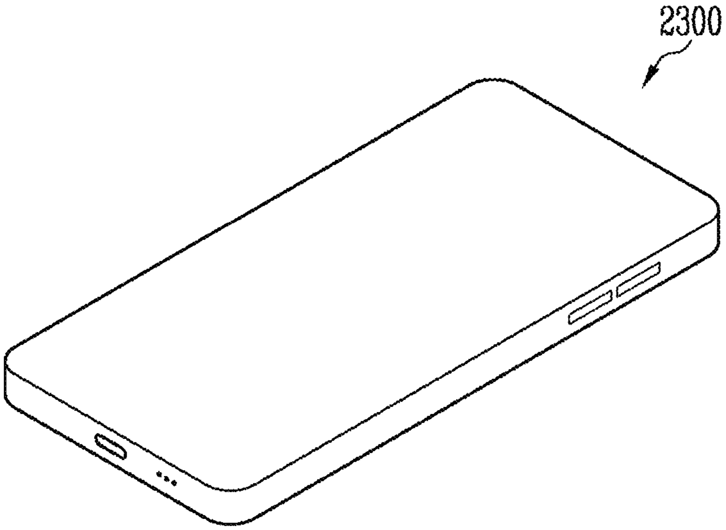
FIG. 23 is a perspective view illustrating an example in which the electronic device shown in FIG. 21 is implemented as a smartphone.

FIG. 21 is a block diagram illustrating an electronic device including a display device in accordance with some embodiments of the present disclosure. FIG. 22 is a perspective view illustrating an example in which the electronic device shown in FIG. 21 is implemented as a tablet personal computer (PC). FIG. 23 is a perspective view illustrating an example in which the electronic device shown in FIG. 21 is implemented as a smartphone.

Referring to FIG. 21, the electronic device ED may include a processor PRC, a memory device MEM, a storage device SD, an input/output (I/O) device IO, a power supply, PS, and a display device 2100. The display device 2100 may be the display device DD described above with reference to FIG. 1. Also, the electronic device ED may further include several ports capable of communicating with a video card, a sound card, a memory card, a USB device, and the like, or communicating with other systems. In an embodiment, the electronic device ED may be implemented as a tablet PC. However, the present disclosure is not limited thereto, and the electronic device ED is not limited thereto. For example, the electronic device ED may be implemented as a mobile phone, a video phone, a smart pad, a smart watch, a vehicle navigation system, a computer monitor, a notebook computer, a head mounted display device, or the like.

The processor PRC may perform specific calculations or tasks. In some embodiments, the processor PRC may be a microprocessor, a central processing unit, an application processor, or the like. The processor PRC may be connected to other components through an address bus, a control bus, a data bus, and the like. In some embodiments, the processor PRC may be connected to an extension bus such as a peripheral component interconnect (PCI) bus.

The memory device MEM may store data used for an operation of the electronic device ED. For example, the memory device MEM may include a nonvolatile memory device such as an Erasable Programmable Read-Only Memory (EPROM) device, an Electrically Erasable Programmable Read-Only Memory (EEPROM) device, a flash memory device, a Phase Change Random Access Memory (PRAM) device, a Resistance Random Access Memory (RRAM) device, a Nano Floating Gate Memory (NFGM) device, a Polymer Random Access Memory (PoRAM) device, a Magnetic Random Access Memory (MRAM) device, or a Ferroelectric Random Access Memory (FRAM) device, and/or a volatile memory device such as a Dynamic Random Access Memory (DRAM) device, a Static Random Access Memory (SRAM) device, or a mobile DRAM device.

The storage device SD may include a Solid State Drive (SSD), a Hard Disk Drive (HDD), a Compact Disc Read Only Memory (CD-ROM), and the like.

The I/O device IO may include an input means or device, such as a keyboard, a keypad, a touch screen, or a mouse, and an output means or device, such as a speaker or a printer. In some embodiments, the display device 2100 may be included in the I/O device IO.

The power supply PS may supply power used for an operation of the electronic device ED. For example, the power supply PS may be a power management integrated circuit (PMIC).

The display device 2100 may display an image corresponding to visual information of the electronic device ED. The display device 2100 may be an organic light emitting display device or a quantum dot light emitting display device, but the present disclosure is not limited thereto. The display device 2100 may be connected to other components through the buses or another communication link.

Referring to FIG. 22, the age of a tablet PC 2200 including a display device in accordance with some embodiments of the present disclosure may be relatively extended. In other words, the tablet PC 2200 including the display device in accordance with some embodiments of the present disclosure may display an image having an improved quality for a relatively longer time.

Referring to FIG. 23, the age of a smartphone 2300 including a display device in accordance with some embodiments of the present disclosure may be relatively extended. In other words, the smartphone 2300 including the display device in accordance with some embodiments of the present disclosure may display an image having an improved quality for a relatively longer time.

In accordance with some embodiments of the present disclosure, one or more sub-pixels expressing the same or substantially the same color as each other may be disposed in a pixel (e.g., in the same pixel), so that the display device may display an image having an improved quality for a relatively longer time.

The electronic or electric devices and/or any other relevant devices or components according to embodiments of the present disclosure described herein (e.g., the main controller, the aging determiner, the signal generator, and/or the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A pixel comprising:

first sub-pixels comprising a (1_1)th sub-pixel and a (1_2)th sub-pixel;

second sub-pixels comprising a (2_1)th sub-pixel and a (2_2)th sub-pixel, and configured to emit light of a color different from that of the first sub-pixels; and a third sub-pixel configured to emit light of a color different from that of each of the first sub-pixels and the second sub-pixels, wherein the pixel comprising the first sub-pixels, the second sub-pixels, and the third sub-pixel is located in one row and one column of a display device, wherein the (1_1)th sub-pixel and the (2_1)th sub-pixel are configured to be driven during a first period, and not driven during a second period, and wherein the (1_2)th sub-pixel and the (2_2)th sub-pixel are configured to be driven during the second period, and not driven during the first period.

2. The pixel of claim 1, wherein the (1_1)th sub-pixel and the (1_2)th sub-pixel are configured to emit light having the same luminance as each other, and wherein the (2_1)th sub-pixel and the (2_2)th sub-pixel are configured to emit light having the same luminance as each other.

3. The pixel of claim 1, wherein the (1_1)th sub-pixel and the (1_2)th sub-pixel are configured to be alternately driven, wherein the (2_1)th sub-pixel and the (2_2)th sub-pixel are configured to be alternately driven, and wherein each of the first period and the second period corresponds to one frame.

4. The pixel of claim 1, wherein the first period is the same as a threshold age of each of the (1_1)th sub-pixel and the (2_1)th sub-pixel.

5. The pixel of claim 1, wherein the first sub-pixels, the second sub-pixels, and the third sub-pixel are located side by side with one another along a first direction, wherein the (1_2)th sub-pixel is located between the (1_1)th sub-pixel and the (2_1)th sub-pixel, and wherein the (2_2)th sub-pixel is located between the (2_1)th sub-pixel and the third sub-pixel.

6. The pixel of claim 1, wherein the (1_1)th sub-pixel and the (2_1)th sub-pixel are located adjacent to each other in a first direction, wherein the (1_2)th sub-pixel is located adjacent to the (2_2)th sub-pixel in the first direction, and is located adjacent to the (1_1)th sub-pixel and the (2_1)th sub-pixel in a second direction crossing the first direction, and wherein the third sub-pixel has an 'L' shape that is inverted in the first direction, and surrounds around at least a portion of the (2_2)th sub-pixel.

7. The pixel of claim 1, wherein the (2_1)th sub-pixel and the (2_2)th sub-pixel are located adjacent to each other in a first direction, wherein the (1_1)th sub-pixel is located adjacent to the (2_1)th sub-pixel in a second direction crossing the first direction, wherein the (1_2)th sub-pixel is located adjacent to the (2_2)th sub-pixel in the second direction, and wherein the third sub-pixel is located between the (1_1)th sub-pixel and the (1_2)th sub-pixel.

8. The pixel of claim 1, wherein the (1_1)th sub-pixel, the (2_1)th sub-pixel, the (1_2)th sub-pixel, and the (2_2)th sub-pixel are sequentially located along a first direction, and wherein the third sub-pixel extends in the first direction, and is located adjacent to the first sub-pixels and the second sub-pixels in a second direction crossing the first direction.

9. The pixel of claim 1, wherein the (1_1)th sub-pixel and the (2_1)th sub-pixel are located adjacent to each other in a first direction, wherein the (1_2)th sub-pixel is located adjacent to the (2_2)th sub-pixel in the first direction, and is located adjacent to the (1_1)th sub-pixel and the (2_1)th sub-pixel in a second direction crossing the first direction, and wherein the third sub-pixel has an 'L' shape that is inverted in the second direction, and surrounds around at least a portion of the (2_2)th sub-pixel.

10. A pixel comprising:

first sub-pixels comprising a (1_1)th sub-pixel and a (1_2)th sub-pixel;

second sub-pixels comprising a (2_1)th sub-pixel and a (2_2)th sub-pixel, and configured to emit light of a color different from that of the first sub-pixels; and third sub-pixels comprising a (3_1)th sub-pixel and a (3_2)th sub-pixel, and configured to emit light of a color different from that of each of the first sub-pixels and the second sub-pixels, wherein the (1_1)th sub-pixel, the (2_1)th sub-pixel, and the (3_1)th sub-pixel are configured to be driven during a first period, and not driven during a second period, wherein the (1_2)th sub-pixel, the (2_2)th sub-pixel, and the (3_2)th sub-pixel are configured to be driven during the second period, and not driven during the first period, and wherein at least a portion of the (3_1)th sub-pixel is directly adjacent to at least a portion of the (3_2)th sub-pixel.

11. The pixel of claim 10, wherein the (1_1)th sub-pixel and the (1_2)th sub-pixel are configured to emit light with the same luminance as each other, wherein the (2_1)th sub-pixel and the (2_2)th sub-pixel are configured to emit light with the same luminance as each other, and wherein the (3_1)th sub-pixel and the (3_2)th sub-pixel are configured to emit light with the same luminance as each other.

12. The pixel of claim 10, wherein the first sub-pixels, the second sub-pixels, and the third sub-pixels are located side by side with one another in a first direction, wherein the (1_2)th sub-pixel is located between the (1_1)th sub-pixel and the (2_1)th sub-pixel, and wherein the (2_2)th sub-pixel is located between (2_1)th sub-pixel and the (3_1)th sub-pixel.

13. The pixel of claim 10, wherein the (1_1)th sub-pixel and the (2_1)th sub-pixel are located adjacent to each other in a first direction, wherein the (1_2)th sub-pixel is located adjacent to the (2_2)th sub-pixel in the first direction, and is located adjacent to the (1_1)th sub-pixel and the (2_1)th sub-pixel in a second direction crossing the first direction, wherein the (3_1)th sub-pixel is located adjacent to the (2_1)th sub-pixel in the first direction, and wherein the (3_2)th sub-pixel is located adjacent to the (2_2)th sub-pixel in the first direction.

14. The pixel of claim 10, wherein the (1_1)th sub-pixel, the (2_1)th sub-pixel, the (1_2)th sub-pixel, and the (2_2)th sub-pixel are sequentially located along a first direction, wherein the (3_1)th sub-pixel is located adjacent to the (1_1)th sub-pixel and the (2_1)th sub-pixel in a second direction crossing the first direction, and wherein the (3_2)th sub-pixel is located adjacent to the (2_1)th sub-pixel and the (2_2)th sub-pixel in the second direction.

15. An electronic device comprising:

a processor configured to provide input image data; and a display device configured to display an image based on the input image data, the display device comprising:

a pixel comprising a plurality of sub-pixels; and a main controller configured to control the sub-pixels based on driving data and aging data of the sub-pixels, wherein the sub-pixels comprise:

a (1_1)th sub-pixel and a (2_1)th sub-pixel configured to be driven during a first period, and not driven during a second period different from the first period;

a (1_2)th sub-pixel and a (2_2)th sub-pixel configured to be driven during the second period, and not driven during the first period; and a third sub-pixel configured to be driven during the first period and the second period, and wherein the pixel comprising the sub-pixels comprising the (1_1)th sub-pixel, the (2_1)th sub-pixel, the (1_2)th sub-pixel, the (2_2)th sub-pixel, and the third sub-pixel is located in one row and one column of the display device.

16. The electronic device of claim 15, wherein the main controller comprises:

memory including a lookup table configured to store the aging data including information on a threshold age of each of the sub-pixels;

an aging determiner configured to generate the driving data on a driving time point of each of the sub-pixels; and a signal generator configured to generate an output control signal for individually controlling the sub-pixels based on the aging data and the driving data.

17. The electronic device of claim 16, wherein the signal generator is configured to determine the first period to correspond to the threshold age of each of the (1_1)th sub-pixel and the (2_1)th sub-pixel.

18. The electronic device of claim 16, wherein the signal generator is configured to determine each of the first period and the second period as one frame, wherein the (1_1)th sub-pixel and the (1_2)th sub-pixel are configured to be alternately driven based on the output control signal, and wherein the (2_1)th sub-pixel and the (2_2)th sub-pixel are configured to be alternately driven based on the output control signal.

* * * * *